(12) United States Patent
Bezos et al.

(10) Patent No.: US 8,732,011 B2
(45) Date of Patent: *May 20, 2014

(54) SYSTEM FOR IMPLEMENTING A PERFORMANCE-BASED CUSTOMER REFERRAL PROGRAM

(75) Inventors: Jeffrey P. Bezos, Seattle, WA (US); Sheldon J. Kaphan, Seattle, WA (US); Ellen L. Ratajak, Seattle, WA (US); Thomas K. Schonhoff, Seattle, WA (US)

(73) Assignee: Amazon.com, Inc., Seattle, WA (US)

(*) Notice: Subject to any disclaimer, the term of this patent is extended or adjusted under 35 U.S.C. 154(b) by 42 days.

This patent is subject to a terminal disclaimer.

(21) Appl. No.: 13/154,270

(22) Filed: Jun. 6, 2011

(65) Prior Publication Data
US 2011/0238528 A1    Sep. 29, 2011

Related U.S. Application Data

(60) Continuation of application No. 11/961,808, filed on Dec. 20, 2007, now Pat. No. 8,494,923, which is a division of application No. 09/366,931, filed on Aug. 4, 1999, now Pat. No. 7,337,133, which is a continuation of application No. 08/883,770, filed on Jun. 27, 1997, now Pat. No. 6,029,141.

(51) Int. Cl.
*G06Q 40/00*    (2012.01)
(52) U.S. Cl.
USPC ....... 705/14.16; 705/39; 705/27.1; 705/14.36
(58) Field of Classification Search
USPC ............................. 705/35, 37, 26
See application file for complete search history.

(56) References Cited

U.S. PATENT DOCUMENTS

| | | | |
|---|---|---|---|
| 5,319,542 A | 6/1994 | King, Jr. et al. | |
| 5,537,314 A | 7/1996 | Kanter | |
| 5,590,197 A | 12/1996 | Chen et al. | |
| 5,712,979 A | 1/1998 | Graber et al. | |
| 5,715,314 A | 2/1998 | Payne et al. | |
| 5,717,850 A | 2/1998 | Apperley et al. | |

(Continued)

FOREIGN PATENT DOCUMENTS

WO    9713330 A2    4/1997

OTHER PUBLICATIONS

Transcript of Markman Hearing in matter of *Discovery Communications, Inc. v. Amazon.com* (C.A. No. 09-178-ER).

(Continued)

*Primary Examiner* — Olabode Akintola
*Assistant Examiner* — Abhishek Vyas
(74) *Attorney, Agent, or Firm* — Knobbe, Martens, Olson & Bear, LLP

(57) ABSTRACT

A system for implementing a performance-based customer referral program includes a referral tracking system capable of tracking referrals of users from participant sites to a retail site, and capable of determining whether such referrals result in purchases on the retail site. The tracked referral activity may, for example, be used to determine performance-based commissions to pay to the participants. The system may also include an enrollment system that partially or fully automates the task of enrolling new participants and their sites in the referral program. In addition, the system may include a report generation system that provides the participants with activity reports regarding the referral and purchase activity attributable to their sites.

24 Claims, 14 Drawing Sheets

(56) References Cited

U.S. PATENT DOCUMENTS

| | | | |
|---|---|---|---|
| 5,717,860 A | | 2/1998 | Graber et al. |
| 5,724,424 A | | 3/1998 | Gifford |
| 5,745,681 A | | 4/1998 | Levine et al. |
| 5,812,769 A | | 9/1998 | Graber et al. |
| 5,819,285 A | * | 10/1998 | Damico et al. ........................ 1/1 |
| 5,895,454 A | | 4/1999 | Harrington |
| 5,901,287 A | | 5/1999 | Bull et al. |
| 5,930,764 A | * | 7/1999 | Melchione et al. .......... 705/7.29 |
| 5,991,735 A | | 11/1999 | Gerace |
| 5,991,740 A | * | 11/1999 | Messer ...................... 705/14.29 |
| 6,016,504 A | | 1/2000 | Arnold et al. |
| 6,029,141 A | | 2/2000 | Bezos et al. |
| 6,065,048 A | | 5/2000 | Higley |
| 6,070,160 A | * | 5/2000 | Geary .................................... 1/1 |
| 6,141,666 A | * | 10/2000 | Tobin ............................ 715/207 |
| 6,460,072 B1 | | 10/2002 | Arnold et al. |
| 7,337,133 B1 | | 2/2008 | Bezos et al. |

OTHER PUBLICATIONS

Notice of Subpoena and Notice of Deposition of Infospace, Inc. In matter of *Discovery Communications, Inc.* v. *Amazon.com* (C.A. No. 09-178-ER).
Notice of Subpoena and Notice of Deposition of John K. Arnold in matter of *Discovery Communications, Inc.* v. *Amazon.com* (C.A. No. 09-178-ER).
Notice of Subpoena and Notice of Deposition of Kurt Dennis Dahl in matter of *Discovery Communications, Inc.* v. *Amazon.com* (C.A. No. 09-178-ER).
Notice of Subpoena and Notice of Deposition of PC Flowers & Gifts.com, Inc. In matter of *Discovery Communications, Inc.* v. *Amazon.com* (C.A. No. 09-178-ER).
Notice of Subpoena and Notice of Deposition of William J. Tobin in matter of *Discovery Communications, Inc.* v. *Amazon.com* (C.A. No. 09-178-ER).
Notice of Amended Subpoena to Bertelsmann DMI, Inc. (Document 149) in matter of *Discovery Communications, Inc.* v. *Amazon.com* (C.A. No. 09-178-ER).
Notice of Amended Subpoena to Bertelsmann DMI, Inc. (Document 151) in matter of *Discovery Communications, Inc.* v. *Amazon.com* (C.A. No. 09-178-ER).
Notice of Subpoenas and Depositions of Thomas K. Schonhoff and W. Frederick Zimmerman (Document 42) in matter of *Discovery Communications, Inc.* v. *Amazon.com* (C.A. No. 09-178-ER).
Amazon.com, Inc.'s Objections and Responses to Discovery Communications, Inc.'s Second Set of Interrogatories in matter of *Discovery Communications, Inc.* v. *Amazon.com* (C.A. No. 09-178-ER).
Amazon.com, Inc.'s Objections and Responses to Discovery Communications, Inc.'s Third Set of Interrogatories in matter of *Discovery Communications, Inc.* v. *Amazon.com* (C.A. No. 09-178-ER).
Amazon.com, Inc.'s Amended Objections and Responses to Discovery Communications, Inc.'s Interrogatory No. 7 in matter of *Discovery Communications, Inc.* v. *Amazon.com* (C.A. No. 09-178-ER) (of-record in parent application).
Notice of Subpoena and Notice of Deposition of Jason Olim in matter of *Discovery Communications, Inc.* v. *Amazon.com* (C.A. No. 09-178-ER).
Notice of Subpoena of Bertelsmann DMI, Inc. in matter of *Discovery Communications, Inc.* v. *Amazon.com* (C.A. No. 09-178-ER).
Notice of Subpoena and Notice of Deposition of LinkShare Corporation in matter of *Discovery Communications, Inc.* v. *Amazon.com* (C.A. No. 09-178-ER).
pp. 1 and 11-14 of Discovery Communications, Inc.'s Responses to Defendant Amazon.com, Inc.'s First Set of Interrogatories in matter of *Discovery Communications, Inc.* v. *Amazon.com* (C.A. No. 09-178-ER) (portions redacted per assertion of confidentiality of Discovery Communications, Inc.).
Notice of Subpoena dated Oct. 29, 2010, in matter of *Adrea, LLC* v. *Amazon.com, Inc.* (C.A. No. 10-600-ER).

Amended Notice of Deposition dated Nov. 3, 2010, in matter of *Adrea, LLC* v. *Amazon.com, Inc.* (C.A. No. 10-600-ER).
Defendant and Counterclaimant Amazon.com, Inc.'s Third Supplemental Initial Disclosures, dated Nov. 4, 2010, in matter of *Adrea, LLC* v. *Amazon.com, Inc.* (C.A. No. 10-600-ER).
Amended Notice of Deposition dated Nov. 10, 2010, in matter of *Adrea, LLC* v. *Amazon.com, Inc.* (C.A. No. 10-600-ER).
Amazon.com, Inc.'s Second Amended Objections and Responses to Discovery Communications, Inc.'s Interrogatory No. 7 in matter of *Adrea, LLC* v. *Amazon.com, Inc.* (C.A. No. 10-600-ER).
Amazon.com, Inc.'s Amended Objections and Responses to Discovery Communications, Inc.'s Interrogatory No. 8 in matter of *Adrea, LLC* v. *Amazon.com, Inc.* (C.A. No. 10-600-ER).
Amazon.com, Inc.'s Amended Objections and Responses to Discovery Communications, Inc.'s Interrogatory No. 10 in matter of *Adrea, LLC* v. *Amazon.com, Inc.* (C.A. No. 10-600-ER).
Discovery's First Supplemental Response to Amazon.com's Interrogatory No. 8 in matter of *Adrea, LLC* v. *Amazon.com, Inc.* (C.A. No. 10-600-ER).
Transcript of Deposition of William Zimmerman, dated Nov. 12, 2010, in matter of *Adrea, LLC* v. *Amazon.com, Inc.* (C.A. No. 10-600-ER).
Discovery's Notice of Deposition of Jeffrey Bezos Pursuant to Federal Rule of Civil Procedure 30(b)(1) in matter of *Adrea, LLC* v. *Amazon.com, Inc.* (C.A. No. 10-600-ER).
Amazon.com, Inc.'s Second Amended Objections and Responses to Discovery Communications, Inc.'s Interrogatory No. 8 in matter of *Adrea, LLC* v. *Amazon.com, Inc.* (C.A. No. 10-600-ER).
Amazon.com, Inc.'s Objections and Responses to Counterclaim Defendant's Sixth Set of Interrogatories in matter of *Adrea, LLC* v. *Amazon.com, Inc.* (C.A. No. 10-600-ER).
Opening Brief in Support of Counterclaim Defendant's Motion to Modify Scheduling Order for Leave to File Amended Answer in matter of *Adrea, LLC* v. *Amazon.com, Inc.* (C.A. No. 10-600-ER).
Counterclaim Defendant's Motion to Modify Scheduling Order for Leave to File Amended Answer in matter of *Adrea, LLC* v. *Amazon.com, Inc.* (C.A. No. 10-600-ER).
Exhibit A (document 103-1) to Counterclaim Defendant's Opening Brief filed on Dec. 20, 2010 in matter of *Adrea, LLC* v. *Amazon.com, Inc.* (C.A. No. 10-600-ER).
Exhibit B (document 103-2) to Counterclaim Defendant's Opening Brief filed on Dec. 20, 2010 in matter of *Adrea, LLC* v. *Amazon.com, Inc.* (C.A. No. 10-600-ER).
Exhibit C (document 103-3) to Counterclaim Defendant's Opening Brief filed on Dec. 20, 2010 in matter of *Adrea, LLC* v. *Amazon.com, Inc.* (C.A. No. 10-600-ER).
Exhibit D (document 103-4) to Counterclaim Defendant's Opening Brief filed on Dec. 20, 2010 in matter of *Adrea, LLC* v. *Amazon.com, Inc.* (C.A. No. 10-600-ER).
Deposition transcript of Thomas Schonhoff, dated Dec. 20, 2010, in matter of *Adrea, LLC* v. *Amazon.com, Inc.* (C.A. No. 10-600-ER).
Counterclaim Defendant's Requests for Admission No. 85 to Defendant and Counterclaim Plaintiff Amazon.com, Inc., dated Dec. 31, 2010, in matter of *Adrea, LLC* v. *Amazon.com, Inc.* (C.A. No. 10-600-ER).
Counterclaim Defendant's Interrogatory Nos. 20 and 21, dated Dec. 31, 2010, in matter of *Adrea, LLC* v. *Amazon.com, Inc.* (C.A. No. 10-600-ER).
Subpoena to produce documents, information, or objects or to permit inspection of premises in a civil action, to W. Frederick Zimmerman, in matter of *Adrea, LLC* v. *Amazon.com, Inc.* (C.A. No. 10-600-ER).
Exhibit 81 in Zimmerman Deposition (Article titled "How Wall Street Whiz Found a Niche Selling Books on the Internet") in matter of *Adrea, LLC* v. *Amazon.com, Inc.* (C.A. No. 10-600-ER).
Exhibit 82 in Zimmerman Deposition (email dated Oct. 31, 1995, from Frederick Zimmerman) in matter of *Adrea, LLC* v. *Amazon.com, Inc.* (C.A. No. 10-600-ER).
Exhibit 83 in Zimmerman Deposition in matter of *Adrea, LLC* v. *Amazon.com, Inc.* (C.A. No. 10-600-ER).
Exhibit 84 in Zimmerman Deposition in matter of *Adrea, LLC* v. *Amazon.com, Inc.* (C.A. No. 10-600-ER).
Exhibit 85 in Zimmerman Deposition in matter of *Adrea, LLC* v. *Amazon.com, Inc.* (C.A. No. 10-600-ER).

(56) References Cited

OTHER PUBLICATIONS

Exhibit 86 in Zimmerman Deposition in matter of *Adrea, LLC* v. *Amazon.com, Inc.* (C.A. No. 10-600-ER).
Exhibit 87 in Zimmerman Deposition in matter of *Adrea, LLC* v. *Amazon.com, Inc.* (C.A. No. 10-600-ER).
Exhibit 88 in Zimmerman Deposition in matter of *Adrea, LLC* v. *Amazon.com, Inc.* (C.A. No. 10-600-ER).
Undated article titled "History of Affiliate Marketing," printed from http:///www.affiliatemanager.net/article 17.shtml on Dec. 27, 2004.
Rule 131 Declaration dated Jul. 31, 2004, including exhibits thereto, submitted in U.S. Appl. No. 09/415,124.
Press Release titled: "Open Market: Open Market Inc., first to offer complete end-to-end solution for electronic commerce; new company introduces StoreBuilder kit and system to enable merchants to easily build and manage on-line storefronts," DialogClassic Web(tm), File 810: Business Wire, dated Oct. 24, 1994.
Complaint dated Jun. 22, 2005 filed in mater of *Amazon.com, Inc., et al.* v. *Cendant Corporation, et al.*, Case No. CV05-1137 (eleven pages exhibits omitted).
Declaration of Jason Olim, dated Dec. 21, 2004, in matter of *BTG International, Inc.* v. *Amazon.com, Inc., et al.*, Case No. 04-1264 (39 pages including exhibits).
Declaration of Jason Olim, dated Apr. 29, 2004 (2 pages).
Declaration of Matthew Olim, dated Jul. 13, 2004 (3 pages).
Declaration of Kevin Anderson, dated Oct. 12, 2004 (2 pages).
Hoffman, D. L. and Novak, T. P., "Cdnow's approach to marketing," Strategic Direction, dated Oct. 2000, pp. 17-18.
Hoffman, D. L. and Novak, T. P., "When Exposure-Based Web Advertising Stops Making Sense (and What CDNOW Did About It)," eLab, Vanderbilt University, draft date: Jan. 2000, 13 pages.
Hoffman, D. L. and Novak, T. P., "How to Acquire Customers on the Web," Harvard Buisness Review, May/Jun. 2000, reprint R00305.
"Amazon.com Introduces 'Amazon.com Associates' A New model for Internet-Based Commerce," No. 4463978, Dialog File 16, Business Wire, Jul. 18, 1996, 3 pages.
Booker, et al., "On-line options blooming: Hearts afire on the net," Computerworld, Feb. 13, 1995, vol. 29, No. 7, 3 pages.
Kisor, Henry, "BookWire on the Web: A virtual candy store for cyberbibliophiles," Chicago Sun-Times, Jun. 23, 1996, p. 14.
Email correspondence dated Apr. 22, 1996, between Amazon.com and epic@fddisunsite.oit.unc.edu.
Email correspondence of nicholas@amazon.com, dated Apr. 25, 1996.
Email correspondence dated May 7, 1996, between tom@localhost and stevens.amazon.com.
Foster, Ed, "Can mixing cookies with online marketing be a recipe for heartburn?" InfoWorld, Jul. 22, 1996, vol. 18, No. 30, p. 54.
Selected documents from Books.com Web site describing Book Stacks Unlimited links partner program, downloaded and printed Jun. 20, 1997 and Jun. 23, 1997.
Selected documents from Incognito Cafe Web site describing several on-line bookstore links, undated (5 printed pages).
Can Mixing "Cookies" with Online Marketing be a Recipe for Heartburn? (Infoworld, vol. 18, No. 30).
Real Time Travel Info Available Online (Dialog database file 9, document 01107096).
Online Growth Virtually Untapped; PC Vendors Taking More Advantage of Booming Sales (Computer Retail Week vol. 4, No. 64, p. 160) Jun. 6, 1994.
Resnick, P., Iacovou, N., Suchak, M., Bergstrom, P., and Riedl, J., GroupLens: An Open Architecture for Collaborative Filtering of Netnews. Proceedings of ACM 1994 Conference on Computer Supported Cooperative Work, Chapel Hill, NC, pp. 175-186.
Balabanovic, M., and Shoham, Y., Fab: Content-Based, Collaborative Recommendations. Communications of the ACM, vol. 40, No. 3, (Mar. 1997).
Dialog file 16 (database PROMT(R)), No. 6016914, "BookSite launches version 3.0 of the popular electronic commerce web site," Business Wire, 2 pages.

B. Dunn and S. Kurzrock, "Human Resources Effectiveness Tests for Sales Compensation Plans," The Bankers Magazine, pp. 65-68, Sep.-Oct. 1989.
One-page description of alleged iBill prior art provided to applicants by Internet Billing Company, Ltd.
Reprint of press release titled, "Earthport claims prior art in amazon patent," Scripting News, Mar. 2, 2000 (2 pages printed from Internet).
Internet Patent News Service email, dated Feb. 29, 2000.
Information Disclosures Statement filed on May 10, 1999, in original parent U.S. Appl. No. 08/883,770, disclosing certain pre-filing activities and email correspondence of Amazon.com, Inc.
Agreement dated Mar. 1, 1996, between Amazon.com and IBIC.
"On-line options blooming: Hearts afire on the 'net," ProQuest, vol. 29, Issue 7, ISSN 00104841, printed on Jun. 20, 2002.
Supplemental Information Disclosure Statement filed on Nov. 22, 2000, in parent U.S. Appl. No. 09/366,931.
Complaint for Patent Infringement in matter of *Discovery Communications, Inc.* v. *Amazon.com, Inc.* (C.A. No. 09-178-ER).
Defendant Amazon.com, Inc.'s Answer, Defenses and Counterclaims to the Complaint in matter of *Discovery Communications, Inc.* v. *Amazon.com, Inc.* (C.A. No. 09-178-ER).
Defendant Amazon.com, Inc.'s First Amended Answer, Defenses and Counterclaims to the Complaint in matter of *Discovery Communications, Inc.* v. *Amazon.com, Inc.* (C.A. No. 09-178-ER).
Defendant Amazon.com, Inc.'s Second Amended Answer, Defenses and Counterclaims to the Complaint in matter of *Discovery Communications, Inc.* v. *Amazon.com, Inc.* (C.A. No. 09-178-ER).
Discovery Communications, Inc.'s Reply to Defendant Amazon.com, Inc.'s Second Amended Answer, Defenses and Counterclaims to the Complaint, and Discovery Communications, Inc.'s Counterclaim-in-Reply in matter of *Discovery Communications, Inc.* v. *Amazon.com, Inc.* (C.A. No. 09-178-ER).
Complaint for Patent Infringement in matter of Discovery *Patent Holdings, LLC,* v. *Amazon.com, Inc.* (Case 1:99-mc-0999).
Defendant Amazon.com, Inc.'s Answer, Defenses and Counterclaims to the Complaint in matter of *Discovery Patent Holdings, LLC,* v. *Amazon.com, Inc.* (CA No. 10-600-ER (consolidated)).
Defendant Amazon.com, Inc.'s Amended Counterclaims in matter of *Discovery Patent Holdings, LLC,* v. *Amazon.com, Inc.* (CA No. 10-600-ER).
Discovery Patent Holdings, LLC's Reply to Defendant Amazon.com, Inc.'s Answer, Defenses and Counterclaims to the Complaint in matter of *Discovery Patent Holdings, LLC,* v. *Amazon.com, Inc.* (CA No. 10-600-ER).
Discovery's Answer to Amazon.com, Inc.'s Amended Counterclaims in matter of *Discovery Patent Holdings, LLC* v. *Amazon.com, Inc.* (CA No. 10-600-ER).
Plaintiff Discovery Communications, Inc.'s Responsive Claim Construction Brief for U.S. Patent Nos. 6,029,141 and 7,337,133 in matter of *Discovery Communications, Inc.* v. *Amazon.com* (C.A. No. 09-178-ER).
Declaration of Deok Keun Matthew Ahn in Support of Plaintiff Discovery Communications, Inc.'s Responsive Claim Construction Brief for U.S. Patents Nos. 6,029,141 and 7,337,133 in matter of *Discovery Communications, Inc.* v. *Amazon.com* (C.A. No. 09-178-ER).
Declaration of Y. Ernest Hsin in Support of Amazon.com, Inc.'s Opening Markman Brief Regarding Patents Asserted by Amazon in matter of *Discovery Communications, Inc.* v. *Amazon.com* (C.A. No. 09-178-ER).
Defendant Amazon.com, Inc.'s Opening Markman Brief Regarding Patents Asserted by Amazon matter in matter of *Discovery Communications, Inc.* v. *Amazon.com* (C.A. No. 09-178-ER).
Joint Claim Construction Chart in matter of *Discovery Communications, Inc.* v. *Amazon.com* (C.A. No. 09-178-ER).
Complaint for Patent Infringement in matter of *Discovery Communications, Inc.* v. *Amazon.com, Inc.* (C.A. No. 09-178-ER, filed on Mar. 17, 2009).
Defendant Amazon.com, Inc.'s Answer, Defenses and Counterclaims to the Complaint in matter of *Discovery Communications, Inc.* v. *Amazon.com, Inc.* (C.A. No. 09-178-ER, filed on Mar. 17, 2009).

(56) References Cited

OTHER PUBLICATIONS

Defendant Amazon.com, Inc.'s First Amended Answer, Defenses and Counterclaims to the Complaint in matter of *Discovery Communications, Inc.* v. *Amazon.com, Inc.* (C.A. No. 09-178-ER, filed on Mar. 17, 2009).
Defendant Amazon.com, Inc.'s Second Amended Answer, Defenses and Counterclaims to the Complaint in matter of *Discovery Communications, Inc.* v. *Amazon.com, Inc.* (C.A. No. 09-178-ER, filed on Mar. 17, 2009).
Discovery Communications, Inc.'s Reply to Defendant Amazon.com, Inc.'s Second Amended Answer, Defenses and Counterclaims to the Complaint, and Discovery Communications, Inc.'s Counterclaim-in-Reply in matter of *Discovery Communications, Inc.* v. *Amazon.com, Inc.* (C.A. No. 09-178-ER, filed on Mar. 17, 2009).
Complaint for Patent Infringement in matter of *Discovery Patent Holdings, LLC,* v. *Amazon.com, Inc.* (Case 1:99-mc-0999, filed on Jul. 14, 2010).
Defendant Amazon.com, Inc.'s Answer, Defenses and Counterclaims to the Complaint in matter of *Discovery Patent Holdings, LLC,* v. *Amazon.com, Inc.* (CA No. 10-600-ER (consolidated), originally filed on Mar. 17, 2009).
Defendant Amazon.com, Inc.'s Amended Counterclaims in matter of *Discovery Patent Holdings, LLC,* v. *Amazon.com, Inc.* (CA No. 10-600-ER, originally filed on Mar. 17, 2009).
Discovery Patent Holdings, LLC's Reply to Defendant Amazon.com, Inc.'s Answer, Defenses and Counterclaims to the Complaint in matter of *Discovery Patent Holdings, LLC,* v. *Amazon.com, Inc.* (CA No. 10-600-ER, originally filed on Mar. 17, 2009).
Discovery's Answer to Amazon.com, Inc.'s Amended Counterclaims in matter of *Discovery Patent Holdings, LLC* v. *Amazon.com, Inc.* (CA No. 10-600-ER, originally filed on Mar. 17, 2009).
Plaintiff Discovery Communications, Inc.'s Responsive Claim Construction Brief for U.S. Patent Nos. 6,029,141 and 7,337,133 in matter of *Discovery Communications, Inc.* v. *Amazon.com* (C.A. No. 09-178-ER, originally filed on Mar. 17, 2009).
Declaration of Deok Keun Matthew Ahn in Support of Plaintiff Discovery Communications, Inc.'s Responsive Claim Construction Brief for U.S. Patents Nos. 6,029,141 and 7,337,133 in matter of *Discovery Communications, Inc.* v. *Amazon.com* (C.A. No. 09-178-ER, originally filed on Mar. 17, 2009).
Declaration of Y. Ernest Hsin in Support of Amazon.com, Inc.'s Opening Markman Brief Regarding Patents Asserted by Amazon in matter of *Discovery Communications, Inc.* v. *Amazon.com* (C.A. No. 09-178-ER, originally filed on Mar. 17, 2009).
Defendant Amazon.com, Inc.'s Opening Markman Brief Regarding Patents Asserted by Amazon matter in matter of *Discovery Communications, Inc.* v. *Amazon.com* (C.A. No. 09-178-ER, originally filed on Mar. 17, 2009).
Joint Claim Construction Chart in matter of *Discovery Communications, Inc.* v. *Amazon.com* (C.A. No. 09-178-ER, originally filed on Mar. 17, 2009).
Transcript of Markman Hearing in matter of *Discovery Communications, Inc.* v. *Amazon.com* (C.A. No. 09-178-ER, filed on Mar. 17, 2009).
Notice of Subpoena and Notice of Deposition of Infospace, Inc. In matter of *Discovery Communications, Inc.* v. *Amazon.com* (C.A. No. 09-178-ER, filed on Mar. 17, 2009).
Notice of Subpoena and Notice of Deposition of John K. Arnold in matter of *Discovery Communications, Inc.* v. *Amazon.com* (C.A. No. 09-178-ER, filed on Mar. 17, 2009).
Notice of Subpoena and Notice of Deposition of Kurt Dennis Dahl in matter of *Discovery Communications, Inc.* v. *Amazon.com* (C.A. No. 09-178-ER, filed on Mar. 17, 2009).
Notice of Subpoena and Notice of Deposition of PC Flowers & Gifts.com, Inc. In matter of *Discovery Communications, Inc.* v. *Amazon.com* (C.A. No. 09-178-ER, filed on Mar. 17, 2009).

Notice of Subpoena and Notice of Deposition of William J. Tobin in matter of *Discovery Communications, Inc.* v. *Amazon.com* (C.A. No. 09-178-ER, filed on Mar. 17, 2009).
Notice of Amended Subpoena to Bertelsmann DMI, Inc. (Document 149) in matter of *Discovery Communications, Inc.* v. *Amazon.com* (C.A. No. 09-178-ER, filed on Mar. 17, 2009).
Notice of Amended Subpoena to Bertelsmann DMI, Inc. (Document 151) in matter of *Discovery Communications, Inc.* v. *Amazon.com* (C.A. No. 09-178-ER, filed on Mar. 17, 2009).
Notice of Subpoenas and Depositions of Thomas K. Schonhoff and W. Frederick Zimmerman (Document 42) in matter of *Discovery Communications, Inc.* v. *Amazon.com* (C.A. No. 09-178-ER, filed on Mar. 17, 2009).
Amazon.com, Inc.'s Objections and Responses to Discovery Communications, Inc.'s Second Set of Interrogatories in matter of *Discovery Communications, Inc.* v. *Amazon.com* (C.A. No. 09-178-ER, filed on Mar. 17, 2009).
Amazon.com, Inc.'s Objections and Responses to Discovery Communications, Inc.'s Third Set of Interrogatories in matter of *Discovery Communications, Inc.* v. *Amazon.com* (C.A. No. 09-178-ER, filed on Mar. 17, 2009).
Amazon.com, Inc.'s Amended Objections and Responses to Discovery Communications, Inc.'s Interrogatory No. 7 in matter of *Discovery Communications, Inc.* v. *Amazon.com* (C.A. No. 09-178-ER, filed on Mar. 17, 2009).
Notice of Subpoena and Notice of Deposition of Jason Olim in matter of *Discovery Communications, Inc.* v. *Amazon.com* (C.A. No. 09-178-ER, filed on Mar. 17, 2009).
Notice of Subpoena of Bertelsmann DMI, Inc. In matter of *Discovery Communications, Inc.* v. *Amazon.com* (C.A. No. 09-178-ER, filed on Mar. 17, 2009).
Notice of Subpoena and Notice of Deposition of LinkShare Corporation in matter of *Discovery Communications, Inc.* v. *Amazon.com* (C.A. No. 09-178-ER, filed on Mar. 17, 2009).
pp. 1 and 11-14 of Discovery Communications, Inc.'s Responses to Defendant Amazon.com, Inc.'s First Set of Interrogatories in matter of *Discovery Communications, Inc.* v. *Amazon.com* (C.A. No. 09-178-ER, filed on Mar. 17, 2009) (portions redacted per assertion of confidentiality of Discovery Communications, Inc.).
Amazon.com, Inc.'s Second Amended Objections and Responses to Discovery Communications, Inc.'s Interrogatory No. 7 in matter of *Adrea, LLC* v. *Amazon.com, Inc.* (C.A. No. 10-600-ER, originally filed on Mar. 17, 2009).
Amazon.com, Inc.'s Amended Objections and Responses to Discovery Communications, Inc.'s Interrogatory No. 8 in matter of *Adrea, LLC* v. *Amazon.com, Inc.* (C.A. No. 10-600-ER, originally filed on Mar. 17, 2009).
Amazon.com, Inc.'s Amended Objections and Responses to Discovery Communications, Inc.'s Interrogatory No. 10 in matter of *Adrea, LLC* v. *Amazon.com, Inc.* (C.A. No. 10-600-ER, originally filed on Mar. 17, 2009).
Discovery's First Supplemental Response to Amazon.com's Interrogatory No. 8 in matter of *Adrea, LLC* v. *Amazon.com, Inc.* (C.A. No. 10-600-ER, originally filed on Mar. 17, 2009).
Discovery's Notice of Deposition of Jeffrey Bezos Pursuant to Federal Rule of Civil Procedure 30(b)(1) in matter of *Adrea, LLC* v. *Amazon.com, Inc.* (C.A. No. 10-600-ER, originally filed on Mar. 17, 2009).
Amazon.com, Inc.'s Second Amended Objections and Responses to Discovery Communications, Inc.'s Interrogatory No. 8 in matter of *Adrea, LLC* v. *Amazon.com, Inc.* (C.A. No. 10-600-ER, originally filed on Mar. 17, 2009).
Amazon.com, Inc.'s Objections and Responses to Counterclaim Defendant's Sixth Set of Interrogatories in matter of *Adrea, LLC* v. *Amazon.com, Inc.* (C.A. No. 10-600-ER, originally filed on Mar. 17, 2009).
Opening Brief in Support of Counterclaim Defendant's Motion to Modify Scheduling Order for Leave to File Amended Answer in matter of *Adrea, LLC* v. *Amazon.com, Inc.* (C.A. No. 10-600-ER, originally filed on Mar. 17, 2009).
Counterclaim Defendant's Motion to Modify Scheduling Order for Leave to File Amended Answer in matter of *Adrea, LLC* v. *Amazon.com, Inc.* (C.A. No. 10-600-ER, originally filed on Mar. 17, 2009).

(56) References Cited

OTHER PUBLICATIONS

Exhibit D (document 103-4) to Counterclaim Defendant's Opening Brief filed on Dec. 20, 2010 in matter of *Adrea, LLC* v. *Amazon.com, Inc.* (C.A. No. 10-600-ER, originally filed on Mar. 17, 2009).
Subpoena to produce documents, information, or objects or to permit inspection of premises in a civil action, to W. Frederick Zimmerman, in matter of *Adrea, LLC* v. *Amazon.com, Inc.* (C.A. No. 10-600-ER, originally filed on Mar. 17, 2009).
Exhibit 81 in Zimmerman Deposition (Article titled "How Wall Street Whiz Found a Niche Selling Books on the Internet") in matter of *Adrea, LLC* v. *Amazon.com, Inc.* (C.A. No. 10-600-ER, originally filed on Mar. 17, 2009).
Exhibit 83 in Zimmerman Deposition in matter of *Adrea, LLC* v. *Amazon.com, Inc.* (C.A. No. 10-600-ER, originally filed on Mar. 17, 2009).
Exhibit 84 in Zimmerman Deposition in matter of *Adrea, LLC* v. *Amazon.com, Inc.* (C.A. No. 10-600-ER, originally filed on Mar. 17, 2009).
Exhibit 85 in Zimmerman Deposition in matter of *Adrea, LLC* v. *Amazon.com, Inc.* (C.A. No. 10-600-ER, originally filed on Mar. 17, 2009).
Exhibit 86 in Zimmerman Deposition in matter of *Adrea, LLC* v. *Amazon.com, Inc.* (C.A. No. 10-600-ER, originally filed on Mar. 17, 2009).
Exhibit 87 in Zimmerman Deposition in matter of *Adrea, LLC* v. *Amazon.com, Inc.* (C.A. No. 10-600-ER, originally filed on Mar. 17, 2009).
Exhibit 88 in Zimmerman Deposition in matter of *Adrea, LLC* v. *Amazon.com, Inc.* (C.A. No. 10-600-ER, originally filed on Mar. 17, 2009).

* cited by examiner

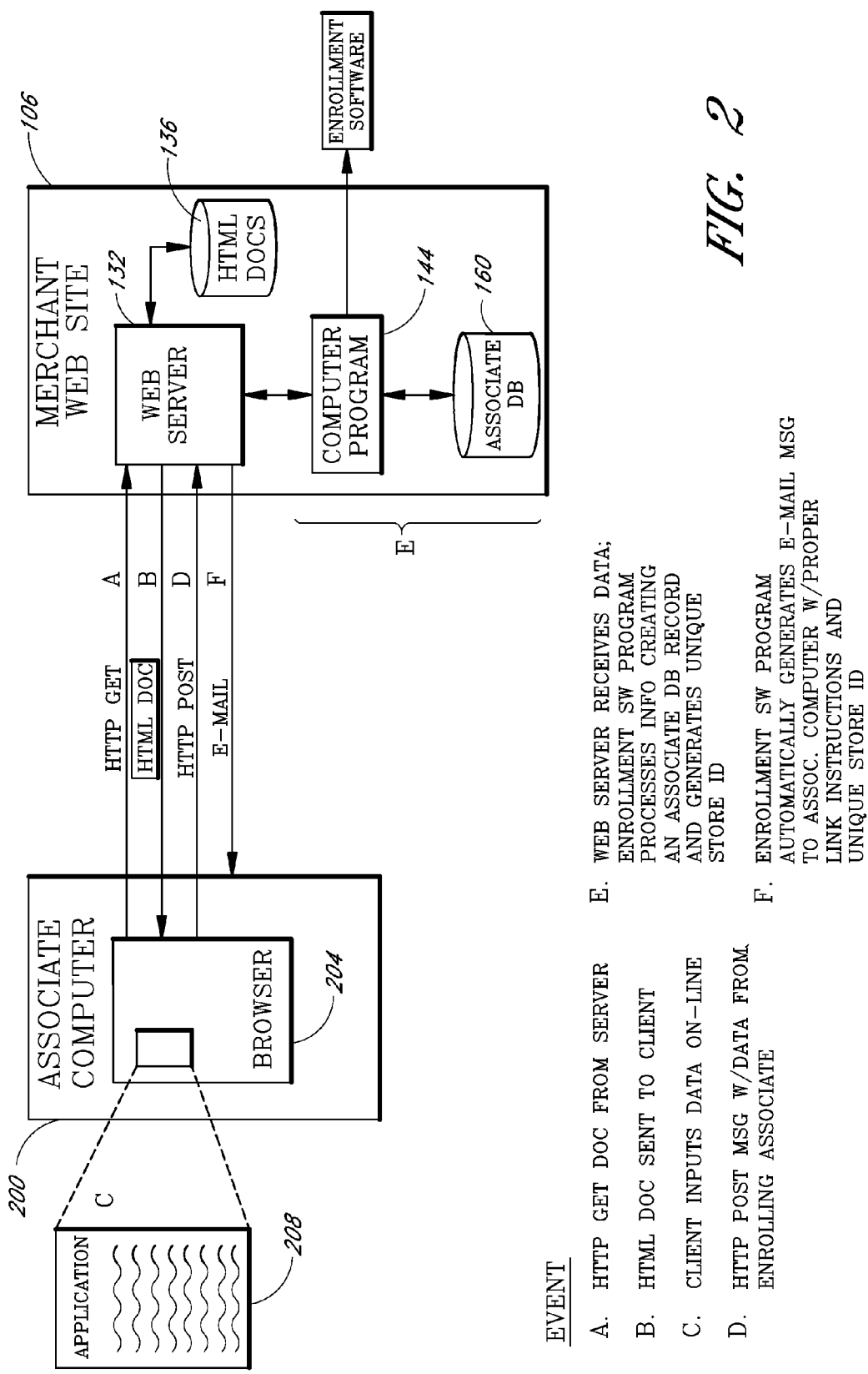

**ARTICLES &
INTERVIEWS**
Amazon.com Journal
Eclectica
In Their Own Words

SIGN-UP
Eyes
Expert Editors

BIG FUN
Win Prizes
Wanna Play?
Customer Reviews

PARTNERS
Associates
Publishers
Authors

AMAZON.COM
About Our Store
Press Clips
Join Our Staff
Customer Comments
Send Us E-mail

HELP
Help Desk
Your Account
New User Guide
Home

Address Line 1:

Address Line 2:

City:

State:

ZIP Code:

Phone number:

Payee's e-mail address:

Describe Your Existing Web Site

Enter the name and URL of the WEB site through which you wish to link our books

Name of the sponsoring Web site:

Home page URL of sponsoring Web site:
http://

Describe Your Intended Book Listings:

Briefly describe the type of books you intend to list on your site. Add any other brief comments or explanation (try to keep this under 10 lines or so):

*FIG. 3B*

Description and comments:

At some point, we may decide to display your name somewhere on our pages during a customer order, e.g. "GoodZookeeping Magazine in association with Amazon.com". Please enter the name we should use to refer to you if we do so. In the above example, the name you entered would have been "GoodZookeeping Magazine". In many cases, we know that this will be the same as the name of your sponsoring Web site, but please enter the correct name here:

Enter the name we should use on these pages:

Submit your application

Before finalizing and submitting your application, please review the Operating Agreement, which describes the terms and conditions of your participation in the Associates Program. Once you have filled out this form and reviewed the agreement, press the "Yes" button to submit your application or the "No" button to exit.

By pressing the "yes" button, you indicate that you want to apply to participate in the Amazon.com Associates Program, that you have reviewed the Operating Agreement and understand its contents, and that, if Amazon.com, Inc. accepts this application, you agree to be bound by the terms and conditions of the operating agreement.

Yes, I want to participate

No, I do not want to participate

*FIG. 3C*

New Titles

Terrain Skiing:

How to master tough skiing, like the experts!

By Seth Masia

You've been through ski school and are a good skier--on groomed terrain. Now what? How do you take your skills into difficult terrain and snow conditions? Seth Masia, long-time SKI Magazine writer and a veteran of the Squaw Valley Ski School, provides insight into how experts make tough conditions look easy--and how you can, too. The book emphasizes terrain absorbtion and cross-over skills that are especially useful for skiers adopting the new supersidecut skis.

Selected as the official manual of the North American Ski Training Center.

"Covers snow conditions like crust, ice, and powder, and terrain situations like bumps, trees and chutes in ways that are succinct and to the point. Skiers want outcome-specific instruction and this book gives it." -- Dave Merriam, SKI Magazine instruction editor and head coach of the PSIA Demonstration Teams.

"Full of mountain smarts and savvy." --Snow Country $12.95. Contemporary Books ISBN 0-8092-3202-2

Click here to order Terrain Skiing!

*FIG. 6*

```
<HR>
<H2>New Titles</H2>
<IMG Align=Left border=1  SRC="terraincov.gif">
<H3><A HREF="http://www.amazon.com/exec/obidos/ISBN=0809232022/skinetA/">Terrain Skiing:</A></H3>
<H4>How to master tough skiing, like the experts!</H4>
<H4>By Seth Masia</h4>
You've been through ski school and are a good skier -- on groomed terrain. Now what? How do you take your skills
into difficult terrain and snow conditions? Seth Masia, long-time Ski Magazine writer and a veteran of the Squaw
Valley Ski School, provides insight into how experts make tough conditions look easy-- and how you can too. The
book emphasizes terrain absorption and cross-over skills that are especially useful for skiers adopting the new
supersidecut skis.

Selected as the official manual of the North American Ski Training Center

"Covers snow conditions like crust, ice, and powder, and terrain situations like bumps, trees and chutes in ways that
are succinct and to the point. Skiers want outcome-specific instructions and this book gives it."  -- Dave Merriam,
Ski Magazine instruction editor and head coach of the PSIA Demonstration Teams.

"full of mountain smarts and savvy."  --Snow Country $12.95.    Contemporary Books ISBN  0-8092-3202-2<P>
<A HREF="http://www.amazon.com/exec/obidos/ISBN=0809232022/skinetA/">Click here to order Terrain Skiing!</A>
<HR>
```

*FIG. 7* starchefs cookbook store

Welcome to the new StarChefs Cookbook Store.

Thanks for stopping in! We're filling our shelves to offer you books from the starchefs and cookbook authors we feature as well as others. Best of all is that because of our association with Amazon Books we can get any book you want, at any time of day or night... 24 hours a day. They can even be giftwrapped and delivered with a note for an epicurean friend! Don't forget to bookmark this page as we will be adding new books all the time!

Darina Allen
The Complete Book of Irish Country Cooking:
Traditional and Wholesome Recipes from Ireland
Hardcover
Published by Penguin USA --Order This CookBook
--More CookBook Info

Daniel Bouland
Cooking With Daniel Bouland
Hardcover
Published by Random House --Order This CookBook
--More CookBook Info

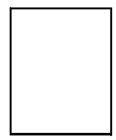

David Burke
Cooking with David Burke
Hardcover
Published by Knopf

--Order This CookBook
--More CookBook Info

*more*  1000

FIG. 10A

| Links | Address | http://www.amazon.com/exec/obidos/ISBN=0679404090/StarChefsCookbooA/6708-3627535-656201 | ▶ |

Amazon.com

WELCOME TO EARTH'S BIGGEST BOOKSTORE

Click here to search our 2.5 million title catalog

Cooking With Daniel Bouland by <u>Daniel Bouland</u>, <u>Todd France</u> (Photographer)

1 Edition
Hardcover, 385 pages
Published by Random House
Publication date: November 1, 1993
Dimensions (in inches): 10.31x8.35x1.03
ISBN: 0679404090

List: $50.00 ~ Our Price: $35.00 ~ You Save: $15.00 (30%)
Availability: On Order; usually ships within 1-2 weeks.

[ Add it to your Shopping Cart ] ← 1002
(You can always remove it later...)

AMAZON.COM
Text Only

SEARCH BY
<u>Author, Title, Subject</u>
<u>Keyword</u>
<u>ISBN</u>
<u>Advanced Query</u>

BUY BOOKS
<u>Shopping Cart</u>
<u>Checkout</u>

SUPER ROOM
<u>Computer & Internet</u>

SYSTEM FOR IMPLEMENTING A PERFORMANCE-BASED CUSTOMER REFERRAL PROGRAM

RELATED APPLICATIONS

This application is a continuation of application Ser. No. 11/961,808, filed Dec. 20, 2007, which is a division of U.S. patent application Ser. No. 09/366,931, filed Aug. 4, 1999 (now U.S. Pat. No. 7,337,133), which is a continuation of U.S. patent application Ser. No. 08/883,770, filed Jun. 27, 1997 (now U.S. Pat. No. 6,029,141). The disclosures of the aforesaid applications are hereby incorporated by reference.

FIELD OF THE INVENTION

This invention relates to electronic commerce. Specifically, this invention relates to information processing methods for marketing and selling goods via the Internet or other interactive network.

APPENDICES

Included as Appendices A and B are documents that illustrate a preferred of the invention. These materials form part of the disclosure of the specification.

BACKGROUND OF THE INVENTION

With the increasing popularity of the Internet and the World Wide Web, it has become common for merchants to set up Web sites for marketing and selling goods. One example of such a Web site is the online bookstore site of AMAZON.COM, the assignee of the present invention. Via this site, consumers can access and place orders from an online book catalog that includes millions of titles.

One problem commonly encountered by online merchants is an inability to effectively market goods via their Web sites. Because the customer cannot physically inspect the products via the Web site, and typically cannot talk to a salesperson, it is desirable that the site provide access to product reviews, product ratings, and other information that can be relied on by the customer to make an informed decision. In many cases, however, the merchant lacks the resources needed to generate or otherwise obtain such information, especially if the merchant sells a large and diverse selection of goods. For example, it would not be practical for AMAZON.COM to prepare reviews of all, or even a significant portion of, the millions of titles available on the AMAZON.COM site.

Another problem commonly faced by online merchants is an inability to efficiently attract potential consumers to their Web sites. One way of attracting consumers has been to market the site through television, newspaper and Internet advertisements. However, advertising a site using conventional methods can be expensive, and can consume significant human resources. In addition, it is often difficult or impossible to evaluate the effectiveness of a given advertisement.

The present invention addresses these and other problems.

SUMMARY

The present invention provides a software system and method for enabling an Internet sales entity, referred to herein as the "merchant," to efficiently market and sell goods in cooperation with Web sites or other network sites of respective business partners, referred to herein as "associates." The system and method are implemented in part by software that runs on the merchant's Web site. Through this site, an entity can enroll (via an automated registration process) as an associate, and can then disseminate catalogs (Web documents, PUSH documents, e-mail newsletters, etc.) that include the associate's reviews and/or recommendations on specific products sold by the merchant.

In accordance with one aspect of the invention, the associate catalog documents include product-specific hyperlinks, referred to herein as "referral links," that allow potential customers to link to the merchant's Web site to initiate purchases of such products from the merchant. Each referral link is provided within the catalog document in association with referral information that is transmitted to the merchant's site when a user (customer) clicks on the referral link. This referral information preferably includes the unique ID of the associate (assigned upon enrollment) and the unique ID of the selected product. Referral processing software running on the merchant site uses this information to identify the associate that referred the customer to the merchant site, and to identify the product selected from the associate's catalog. If the customer subsequently purchases the selected product from the merchant site (e.g., by filling out an order form page and submitting the order), the referral processing software automatically credits the referring associate for the referral by, for example, applying a commission to an account of the associate. In one implementation, the referral commission is automatically generated based on a fixed percentage of the merchant's selling price, and is paid to the associate electronically on a periodic basis (such as every calendar quarter).

In accordance with another aspect of the invention, the merchant site implements an automated associate enrollment process for allowing individuals and business entities to register as associates. The enrollment process is implemented in part by Web pages that are transmitted to the computer of the associate applicant, and by enrollment software that runs on the merchant site. During the enrollment process, the applicant is presented with an online business agreement (in the form of a Web page) that sets forth the terms and conditions of doing business with the merchant In addition, the applicant is presented with an online form that requests various information, such as the name, payment address and e-mail address of the applicant and a description of the proposed associate Web site. In one implementation, the enrollment software includes text scanning code that automatically scans the completed form for pre-specified words and phrases (vulgarities, etc.) that may give rise to a rejection of the application, and flags the application for further (human) review when such a word or phrase is found.

As part of the online registration, the application is processed (either automatically or by a staff member of the merchant), and the enrollment software generates and assigns a unique associate ID to the applicant, and stores this ID (together with other associate information) in an associate database of the merchant site. In addition, the enrollment software generates and sends an e-mail message to the associate with instructions for placing referral links within catalog documents.

In a preferred, the merchant site includes code that maintains a unified shopping cart data structure ("shopping cart") for each ongoing customer shopping session. For each ongoing shopping session, the shopping cart maintains a record of at least: (i) the products that are currently selected by the customer for prospective purchase, and (ii) the referral source (if any) of each such product. In one implementation, each shopping cart persists on the merchant site for an extended period of time (such as one week) following the most recent access by the customer, thereby allowing the customer to conduct extended shopping sessions. To purchase the products represented within the shopping cart, the customer proceeds to a "check out" area of the merchant site and submits an order. Software running on the merchant site then uses the information collected within the shopping cart to identify, and appropriately credit the account of, each associate that provided a corresponding referral.

An important benefit of the shopping cart feature is that it allows the customer to select products from multiple different sites, and then perform a single check-out to purchase all of the selected products. Another benefit is that it provides an efficient mechanism for crediting the accounts of the associates at the time of purchase. Although the use of a shopping cart provides certain advantages, the referral tracking and crediting features of the invention can be implemented without the use of a shopping cart.

In one implementation, the various components are provided on the Web site of AMAZON.COM as part of the AMAZON.COM Associates Program. Through this program, an individual or business entity can register as an AMAZON.COM associate, and can then set up a Web site to market customized subsets of the books (typically in a particular area of expertise) available from the AMAZON.COM site. For example, a computer company can set up a site (or add an area to an existing site) to recommend and sell selected books on computer programming languages, and a Cajun chef can set up a site to recommend and sell selected books on New Orleans style cooking. The associate is in turn paid a commission or other consideration based on the referrals that result in actual purchases. Because AMAZON.COM handles the various tasks associated with processing orders from customers (including shipping, collections, and customer service), the associate need only be concerned with the administration of the associate Web site.

An important benefit of the invention is that it allows the task of marketing the merchant's products to be efficiently distributed among entities that have established reputations and exposure within their respective fields. Another benefit is that it provides an efficient mechanism for exposing the merchant's Web site to the public, by encouraging others (associates) to set up outgoing links to the merchant's site.

Because the associate enrollment and referral tracking/credit functions are automated in whole or in part, these benefits can be realized with minimal supervision by the merchant. In addition, because the compensation provided to the associates is performance-based (e.g., based on the number of referrals that result in actual sales), the merchant need not be concerned with the existence of large numbers of associates that provide relatively small numbers of referrals.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 2 is an architectural drawing and flow diagram illustrating the enrollment function of the system.

FIGS. 3a-3c are respective screen displays further illustrating the enrollment function.

FIG. 6 is a screen display illustrating an HTML catalog document of the associate's Web site.

FIG. 7 is an HTML listing illustrating a preferred method for embedding a referral link within a catalog document of an associate's Web site.

FIGS. 10a-10c are screen displays illustrating HTML documents of the merchant Web site.

Figure 1:
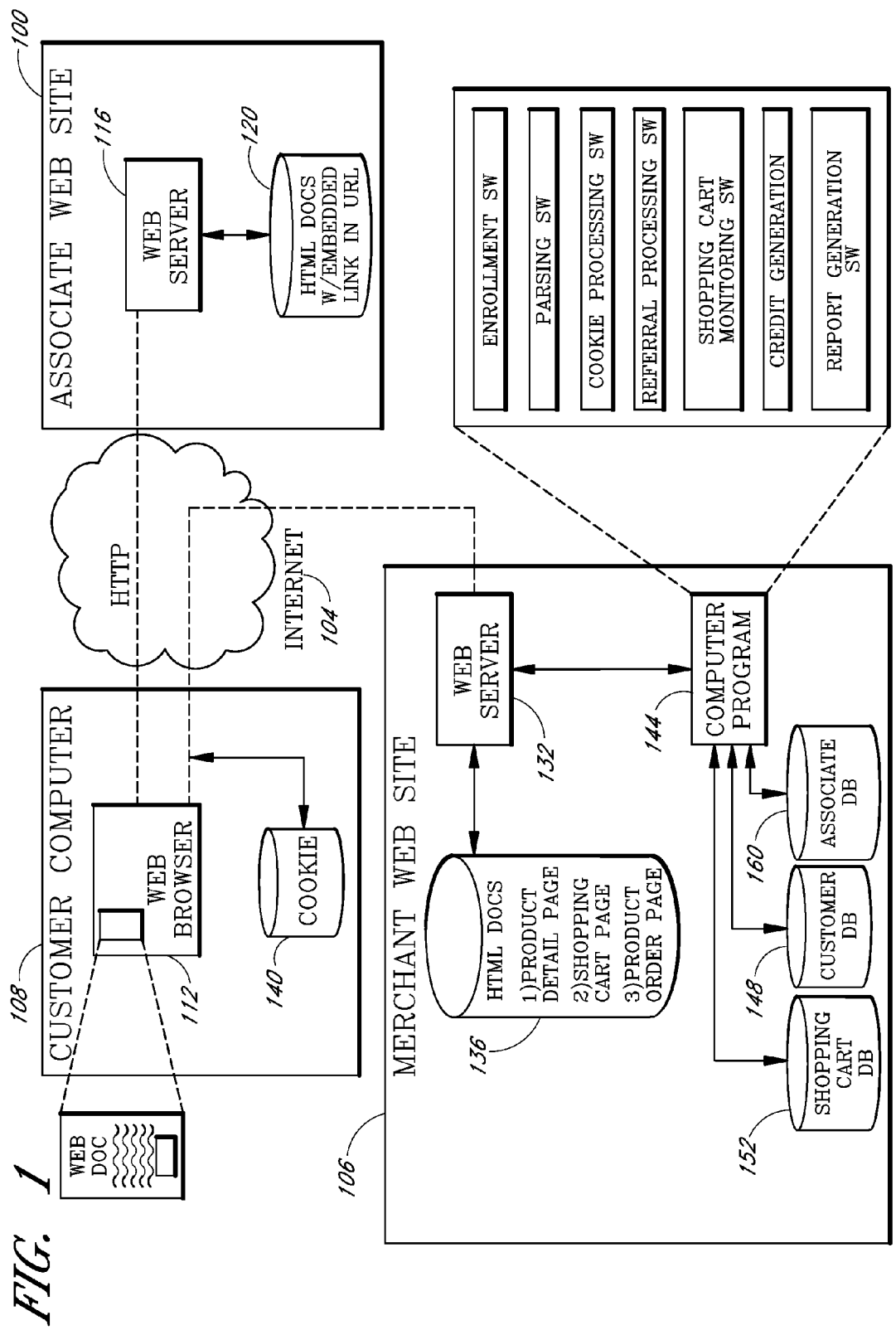
FIG. 1 is a high-level architectural drawing illustrating the primary components of a system that operates in accordance with the present invention.

In the drawings, the first digit of each reference number indicates the Figure number in which the referenced item first appears.

DETAILED DESCRIPTION OF THE PREFERRED EMBODIMENT

To facilitate a complete understanding of the invention, the description of the preferred is arranged within the following sections:
1. GLOSSARY OF TERMS AND ACRONYMS
2. OVERVIEW OF SYSTEM COMPONENTS AND OPERATION
3. ASSOCIATE ENROLLMENT FUNCTION
4. REFERRAL TRANSACTION FUNCTION
5. UNIFIED SHOPPING CART FUNCTION
6. REPORT GENERATION FUNCTION
7. CONCLUSION

1. GLOSSARY OF TERMS AND ACRONYMS

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "amazon.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

ISBN (International Standard Book Number). A numerical identifier associated with books, pamphlets, educational kits, microforms, CD-ROM and braille publications in circulation throughout the world. The ISBN is a ten-digit number assigned to each published title that provides an unduplicated, internationally recognized "identity."

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

Cookies. A technology that enables a Web server to retrieve information from a user's computer that reveals prior browsing activities of the user. The informational item stored on the user's computer (typically on the hard drive) is commonly referred to as a "cookie." Many standard Web browsers support the use of cookies.

PUSH Technology. An information dissemination technology used to send data to users over a network. In contrast to the World Wide Web (a "pull" technology), in which the client browser must request a Web page before it is sent, PUSH protocols send the informational content to the user computer automatically, typically based on information pre-specified by the user.

2. OVERVIEW OF SYSTEM COMPONENTS AND OPERATION

FIG. 1 illustrates the general architecture of a referral system that operates in accordance with the present invention. The system includes a customer computer 108, an associate Web site 100, and a merchant Web site 106, all of which are linked together by the Internet 104. The customer computer 108 may be any type of computing device that allows a user ("customer") to interactively browse Web sites via a Web browser 112. For example, the customer computer 108 may be a personal computer (PC) that runs the Windows NT operating system.

The merchant Web site 106 is a site that provides various functionality for allowing customers to purchase products, including products selected from the Web sites of associates. Typically, this site will be operated by a business entity (referred to herein as the "merchant") that handles the various order processing, shipping, collections, and customer service tasks associated with the sale of goods. In an implementation described herein, the merchant Web site 106 is the site of AMAZON.COM.

As described below, the site 106 includes enrollment software that implements an online registration process for allowing other entities (individuals, companies, etc.) to register as associates. An entity enrolling as an associate provides the merchant Web site 106 with a completed, online registration application that is processed by an enrollment software program ("SW") at the site 106. The enrollment software creates an entry in the associate database 160 according to the information provided by the enrolling associate.

The associate's Web site 100 is the site of an entity that has registered with the merchant, via the online registration process, to market a subset of the merchant's goods in return for compensation (preferably a performance-based commission). Typically, this site is owned and operated by an individual or business entity ("associate") that is not in the same business as that of the merchant. For example, in the context of the AMAZON.COM Associates Program, the associate may be an individual that is in the business of rating mystery novels.

As described below, because the merchant handles the tasks of processing online orders, shipping products, collecting payment, and providing customer service, the associate need not be concerned with these tasks. Thus, the associate can effectively become an online retailer immediately, by simply enrolling as an associate and setting up a Web site.

In addition, because the merchant Web site 106 includes software for automating the primary functions of doing business with associates (such as associate enrollment, referral transaction processing, and commission tracking and payment), the architecture allows the merchant to do business with large numbers (e.g., thousands) of associates with minimal supervision by the merchant. Further, because the commissions paid to the associates are performance-based, there is little or no downside to the merchant to enrolling marginally-productive associates that provide relatively small numbers of referrals.

In operation, the customer accesses the associate's Web site 100 using a standard Web browser 112, such as Microsoft's Internet Explorer or Netscape's Navigator, which uses the HTTP protocol to communicate with a Web server 116 of the associate's site 100. The Web server 116 accesses a local store of catalog documents 120 (in the form of HTML or "Web" documents) which can be requested, retrieved and viewed by the customer via the Web browser 112. These catalog documents 120 include information generated by the associate about the various products featured on the associate's Web site 100. Preferably, this information includes editorial descriptions, reviews, and/or recommendations of the products that assist customers in making informed purchasing decisions.

The catalog documents 120 served by the associate's site 100 include special hyperlinks (to Web pages of the merchant Web site 106) for allowing consumers to select products for prospective purchase. Typically, one such hyperlink is provided for each product displayed on the associate's Web site 100. Alternatively, a hyperlink may be provided for a group of products. When a customer selects (e.g., clicks on) the hyperlink associated with a particular product, the customer is automatically connected to the merchant Web site 106, and presented with various options (included within Web pages 136 served from the merchant Web site 106) for allowing the customer to purchase the selected product from the merchant. The hyperlink thus serves as a referral mechanism for referring the customer to the merchant Web site 106.

As described in detail below, the special hyperlinks (also referred to herein as "referral links") of the associate's catalog documents are provided in association with additional information (embedded in a pre-defined format within the associated URL) that is transmitted to the merchant Web site 106 in response to selection of the link. In one implementation, this information includes a unique identifier of the associate (assigned upon enrollment) and a unique identifier of the selected product (such as the ISBN of a book). A computer program 144 of the merchant Web site 106 uses this information to identify the associate that was the source of the referral, and to credit the sale (referral) to the associate if the customer subsequently purchases the product (or group of products). (In other implementations, the crediting of the associate may occur without regard to whether the product is purchased.) Commission payments can then be paid to the associates on a periodic basis (such as once a month). In one implementation, the commission payments are made electronically, via the computer program 144, without the need for involvement by the merchant.

In one implementation, the merchant Web site 106 comprises a product information database (not shown) that stores product pricing information. The computer program 144 of the merchant site 106 uses this pricing information to calculate the proper commission or referral payment.

Although the implementation described herein uses monetary commissions to compensate the associates for referrals, other forms of compensation can be used. For example, an associate (and/or the associate's customers) could be given a discount on products or services sold by the merchant.

In one implementation of the merchant Web site 106, selection of a referral link causes a product detail page 136 to be displayed on the customer computer 108. This detail page 136 is served by the merchant Web site 106, and includes various information provided by the merchant (price, inventory, standard product description, etc.) about the selected product. From this page, a hyperlink can be selected that allows the selected product to be added to a customer "shopping cart."

The shopping cart is a customer-specific data structure that is generated and maintained (within a shopping cart database 152) by executable code of the merchant site 106. The database may be any type of data repository including, for example, an SQL table or ASCII text file. The information stored within the shopping cart includes a list of the products that have been selected by the customer for prospective purchase, together with an identifier of the referring associate (if any) corresponding to each such product. In one implementation, each shopping cart persists on the site 106 for an extended period of time (such as one week) following the most recent access by the customer, allowing the customer to conduct extended shopping sessions. When the customer proceeds to a check-out area of the merchant site 106 and submits an order for the selected products, the associate identifiers stored within the customer's shopping cart are used to appropriately credit the accounts of the referring associates. Although the shopping cart implementation provides an efficient mechanism for tracking and crediting referral events, referrals can alternatively be credited without the use of a shopping cart, such as by crediting the associate at the time of, or during the same shopping session as, the referral.

Because the identity of the customer is normally unknown to the merchant Web site 106 at the time of the referral event, the site 106 uses cookies technology to identify the customer, so that the customer can be associated with any existing shopping cart created during previous visits to the site 106. This process involves retrieving the cookie 140 from the customer computer 108 with the Web server 132, and then executing a computer program 144 that compares the cookie against information stored in a customer data structure 148. If no shopping cart exists for the customer, or if no cookie exists on the customer computer 108, a shopping cart structure is created for the user. Any of a variety of alternative techniques can be used to identify the customer, including prompting the customer for a user ID, and/or using URL information returned by the customer's Web browser.

Although the described herein uses Web technology to disseminate the catalog documents, any of a variety of document types and electronic dissemination technologies can be used. For example, the associate's catalog documents may be in the form of hypertextual e-mail messages that are disseminated by a list server, or PUSH documents disseminated by a PUSH server. As interactive television, video-on-demand, and Web TV technologies continue to evolve, it is contemplated that the "catalog documents" will include video advertisements that are displayed to the customer on a television screen. Further, although hypertextual catalog documents are preferably used, it is possible for an associate to use non-hypertextual catalogs (including paper-based product catalogs) that simply instruct the customer to manually enter the appropriate URL (including the referral information) into a browser program.

In addition, although the system is described in the context of "the" associate's Web site, it should be recognized that a given associate can disseminate its catalog documents (using the single associate ID assigned during online registration) from multiple different sites, including sites that use different document formats and transfer protocols. Further, although the system is described herein in the context of a merchant that sells products, it will be recognized that the architecture can also be used to sell services, including online services that are provided over the Internet.

As will be appreciated by those skilled in the art, the use of the URL-embedded referral information to identify the associate allows the associate to be identified, and properly credited for the referral, with a high degree of reliability. For example, in contrast to conventional user tracking techniques, the present method allows the associate to be reliably identified even if the associate Web site 100 operates behind a firewall. In addition, the method provides a high degree of flexibility to the associate. For example, the associate can change to a different Internet service provider, and can use or switch between multiple catalog dissemination techniques (Web, e-mail, PUSH, etc.), without affecting the ability of the merchant Web site 106 to identify and credit the associate. Moreover, the associate can freely modify its product offerings—without the need for involvement by the merchant—by simply updating product descriptions and corresponding referral links within the catalog.

A significant benefit of the architecture is that it allows the task of marketing the merchant's products to be efficiently distributed among entities that have established reputations and exposure within their respective fields. In the context of the AMAZON.COM Internet bookstore, for example, a well-established computer company can set up an associate site (or an area of an existing site) to recommend its favorite books on programming languages; and an Italian chef can set up a site to recommend his favorite cookbooks on Italian cooking. In implementations that involve sales of other types of products (such as audio/video equipment), the associates may, for example, include testing laboratories that publish test results.

Because the associate enrollment and referral tracking functions are automated (in whole or in part), the referral services provided by the associates take place with little or no human supervision or intervention by the merchant. In addition, because the payments to the associates are performance-based (e.g., based on the number of sales resulting from associate referrals), the merchant need not be concerned with the effectiveness of any given associate site.

The system and method also provide an efficient mechanism for exposing the merchant and the merchant Web site 106 to the public by encouraging others (associates) to set up outgoing links to the merchant's Web site. For example, this may be beneficial where the merchant Web site 106 is configured to support direct sales (i.e., sales that do not involve referrals from associates), as is this case with the site of AMAZON.COM.

The various components and functions of the referral system are described in further detail below.

3. ASSOCIATE ENROLLMENT FUNCTION

As indicated above, the merchant Web site 106 includes automated enrollment software (FIG. 1) for allowing an entity to apply, via the Internet, to operate as an associate. The registration process may include the following: (i) the presentation of an online business agreement to the applicants, (ii) the use of an automated "agent" to scan the application text for key inputted terms, including vulgarities and other terms that may serve as a basis for denying the application, (iii) the automated generation and assignment of a unique associate ID (also referred to herein as the "store ID") to an applicant, and (iv) the automated electronic transmission of referral link embedding instructions to the applicant.

FIG. 2 illustrates the general flow of information between components when an associate applicant uses a computer 200 to enroll as an associate. The computer 200 includes a conventional Web browser 204 which communicates with the merchant Web server 132 using the HTTP protocol. The Web server 132 accesses a local store 136 of HTML documents (Web pages) which can be requested, retrieved and viewed by the applicant via the Web browser 204. These documents may, for example, include information about registering online to become an associate. Access to the merchant Web site 106 and the enrollment function is available to any client computer 200, and the enrolling associate is not required to have an established Web site at the time of enrollment.

As further illustrated in FIG. 2, the enrolling associate begins the enrollment function by selecting the proper hyperlink from the merchant Web page 136 containing online registration instructions. The merchant Web server 132 accesses a local store of HTML documents 136 and returns an online registration application document 208 (also shown in FIGS. 3a-3c) to the enrolling associate's Web browser 204. The enrolling associate can then fill out the detailed online application form 208.

Figure 3A:

Referring to FIGS. 3a-3c, a preferred of the online application form 208 is shown. The application requests information about the enrolling associate, including the Web server to be used for the associate's Web site, the associate Web site's descriptive name, and the e-mail address of the enrolling associate. Many alternative formats to the online application form are possible and FIGS. 3a-3c are only representative of the types of information that may be requested.

With further reference to FIG. 2, once the electronic application form 204 is completed by the enrolling associate, it is sent from the associate's computer 200 to the merchant Web server 132 for further processing. As will be appreciated by those skilled in the art, other forms of enrollment processing may be used, including but not limited to regular mail and electronic mail. In addition, although the automated enrollment function is preferably handled by the same computer system that handles the referral processing function, these functions could be performed by dedicated, physically distinct computer systems or sites.

In response to submission of the enrollment form, the merchant Web server 132 initiates a computer program 144 comprising enrollment software that processes the information contained on the electronic application form 208. In one implementation, an agent is used to scan the application text for pre-specified terms, and to flag the application for further review (such as by a staff member) if such a term exists. If no such term is found, and the application is complete, the enrollment software automatically accepts the application.

As part of this online registration, once the application has been processed (either automatically or with human intervention), the enrollment software generates a unique store ID to be assigned to the associate. In addition, the enrollment software creates a database entry corresponding to the enrolling associate and stores the store ID and the information provided by the enrolling associate as a unique entry in an associate database 160. The database may be any type of data repository including, for example, an SQL table or ASCII text file. This database entry allows the merchant Web site 106 to properly track and credit associate referrals, as further described below.

Next, the computer program 144 automatically formats and transmits an electronic mail message to the e-mail address of the approved associate. This electronic mail message provides detailed information about setting up an associate's Web site, including instructions on how to create HTML documents with referral links. These instructions specify a predefined format for embedding the store ID and unique product IDs with the HTML link structures. In addition, the e-mail message includes the unique store ID (generated by the enrollment software), and includes instructions on obtaining unique product IDs. The associate can obtain the unique product IDs by browsing the merchant Web site 106. Alternatively, the unique product IDs may be obtained by the associate through a specific electronic mail request, or may be provided by the merchant Web site when the initial electronic mail response is sent. A preferred set of linking instructions that are sent to new associates is included as Appendix A.

Figure 4:
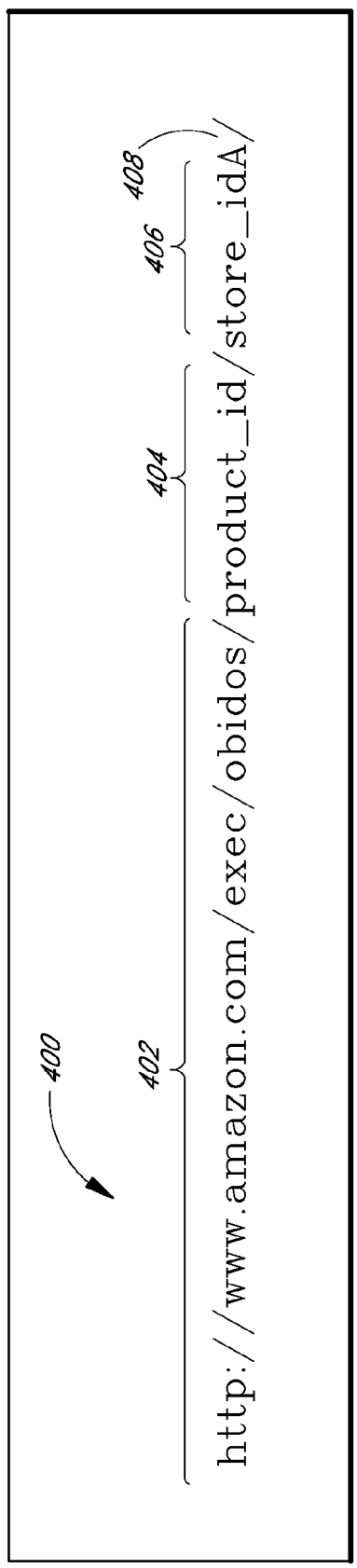
FIG. 4 illustrates a URL format used to embed referral links within Web documents in accordance with the invention.

FIG. 4 illustrates a preferred format of a URL 400 used by an associate to create a referral link to the merchant Web site. This format is recognized by parsing software (FIG. 1) that runs on the merchant Web site. The URL 400 comprises the merchant Web server information 402, the unique product ID 404, the unique store ID 406, and an associate commission scheme ID 408. The unique store ID 406 represents the information created and stored in the associate's database during the associate enrollment process described above. In the AMAZON.COM implementation, the unique product ID 404 is the ISBN of a book that is available from the AMAZON.COM Web site. The associate commission scheme ID is an optional feature that can be used to specify a commission percentage or method for calculating the referral commission.

Upon receipt of the special linking instructions, the associate can begin to build the content (catalog documents) of the associate's Web site, including the descriptions of the products to be featured on the site. An associate can begin to refer customers to the merchant Web site 106 at anytime; however, no credit may be given to the associate for referred customers until the associate has included properly-formatted referral links within its product catalog. Additionally, referral credit may be withheld if the merchant has not yet authenticated and qualified the associate Web site for business.

4. REFERRAL TRANSACTION FUNCTION

Figure 5:
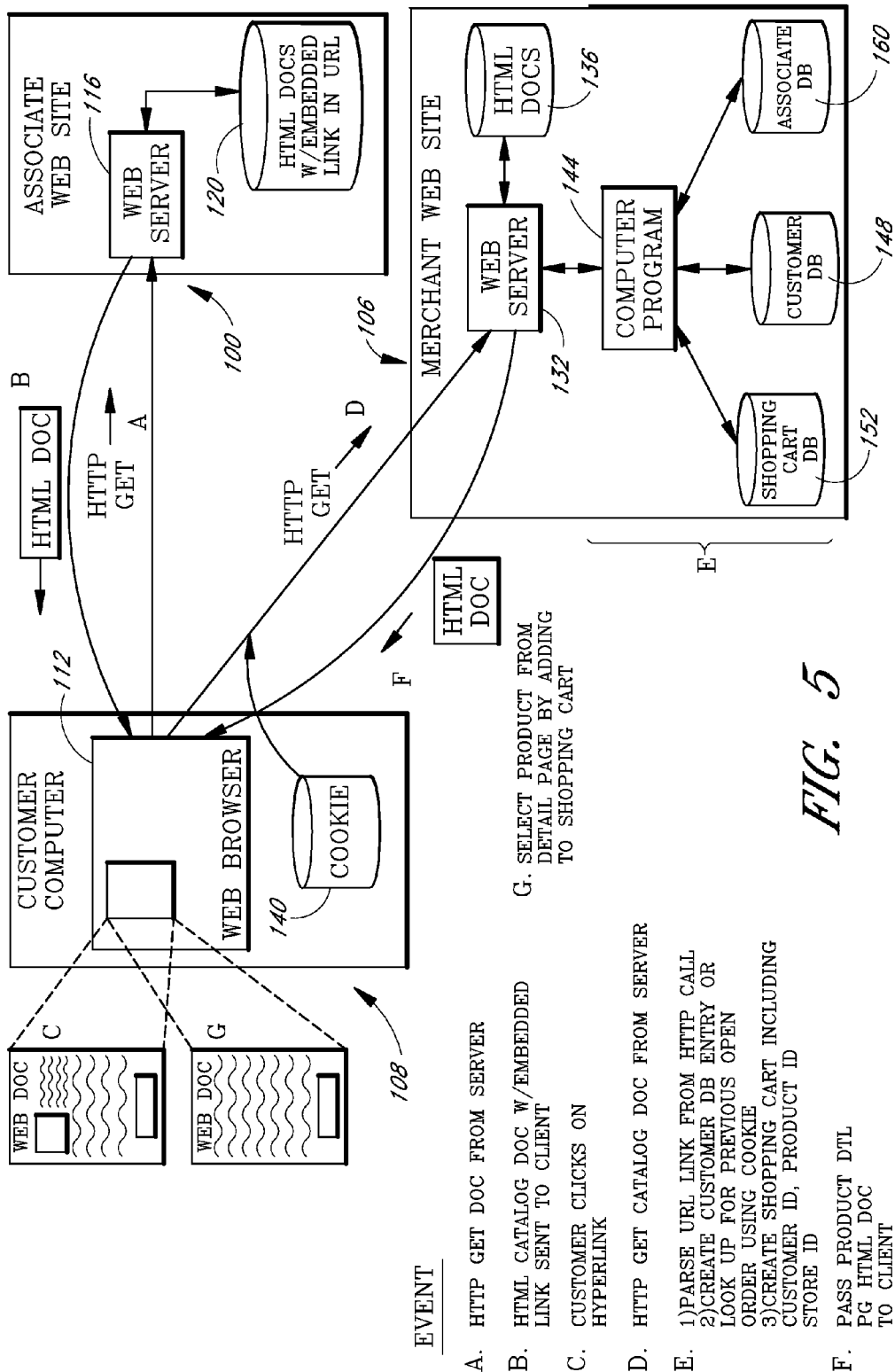
FIG. 5 is an architectural drawing and flow diagram illustrating a referral transaction sequence in accordance with the present invention.

A preferred method for processing referral events will now be described with reference to FIGS. 5-7. Referring to FIG. 5, which depicts an example sequence of events, a customer accesses an associate's Web site 100 via the customer computer 108. The customer computer 108 includes a conventional Web browser 112 which communicates with the associate's Web server 116 using the HTTP protocol. As depicted by events A and B, the Web server 116 accesses a local store of catalog documents 120 (Web pages) which can be requested, retrieved and viewed by the customer via the Web browser 112. As described above, these catalog documents 120 include information about the various products featured at the associate's Web site 100. Preferably, this information includes editorial descriptions, reviews, and recommendations generated by the associate.

FIG. 6 illustrates an example HTML catalog document (Web page) 120 in accordance with the present invention. The customer views the product catalog document 120 via the Web browser 112 in order to select a particular product (book) offered through the associate's Web site 100. In this example, the catalog document 120 comprises a graphic icon 600 that is a scaled-down replica of an actual book cover. The graphic icon 600 also functions as a hyperlink, allowing the customer to click on the icon with a mouse in order to link to the merchant Web site 106. The document 120 includes the title 602 and author of the book 604, and includes an editorial description and recommendation of the book 606 from the associate. The catalog document 120 also contains another textual hyperlink 608, allowing the customer to link to the merchant Web site 106 and initiate referral transaction processing. Typically, the associate's product catalog (which may include multiple catalog pages) contains several referral links (with different product IDs), each corresponding to a different product sold by the merchant FIG. 7 is an HTML source code listing which illustrates a preferred format for including a referral link within an HTML catalog document. The source code of FIG. 7 corresponds to the product catalog document 120 illustrated in FIG. 6. In this example, the referral link (included between the HTML anchor tags "A" and "/A") consists of the URL http://www.amazon.com/exec/obidos/ISBN=0809232022/skinetA/ and the corresponding textual description "Click here to order Terrain Skiing!." The URL is identified as such by the standard HREF (hypertext reference) tag. The portion of the URL preceding "skinetA" uniquely identifies a product detail page (of the AMAZON.COM site) of a book having an ISBN of 0809232022. As described below, the "skinetA" portion of the URL identifies both the referring associate and a commission scheme. The referral link is included within the document such that selection by the customer of the text "Click here to order Terrain Skiing!" causes the Web browser 112 to transmit the URL on the Internet 104 via a standard HTTP message.

Further referring to FIG. 5, upon clicking or otherwise selecting the referral link 608 of the associate's catalog document 120 (event C), the Web browser 112 communicates with the merchant Web server 132 (events D-F) to access HTML documents 136 of the merchant Web site 106. Initially, the customer is shown a product detail page that provides detailed information about the selected product, and allows the customer to add the selected product to the shopping cart (described below). The Web server 132 also serves Web pages (including dynamically-generated pages) that display and allow the customer to edit the contents of the shopping cart, and that allow the customer to proceed to a check-out area to order the selected products.

Once the customer has linked to the merchant Web site 106, the customer can use the navigational controls of the Web browser 112 to return to the associate's Web site 100. In addition, the detail page and/or the shopping cart page may be provided with a hyperlink to allow the customer to return to the associate's Web site 100. Another alternative is for the associate Web site 100 to be created using an HTML frame format. The bottom frame can be designated as the target area frame for the merchant's Web site 106. The top frame can provide navigational controls for the customer to return to the associate's Web site 100 after selection of a particular product at the merchant's Web site 106. This allows the customer to maintain an associate's Web page frame while viewing and processing product purchases at the merchant's Web site 106.

Following the referral event, the customer can browse the merchant Web site 106 for additional products, and can add these products to the shopping cart. In one configuration option, the referring associate is given commission credit for all additional products thereafter selected (during the current browsing session) from the merchant Web site 106, assuming the customer subsequently purchases these products. In another configuration option, the associate is only credited for the purchase of the product that was the subject of the referral.

The sequence of events that takes place when the customer clicks on the referral link 608 will now be described in greater detail. Before the product detail page 136 is sent to the customer's Web browser 112, the merchant Web server 132 initiates a computer program 144 to conduct several processing steps. As depicted by event E1 in FIG. 5, the computer program 144 executes parsing software (FIG. 1) to parse the URL passed to the merchant Web server 132. The parsing software extracts the unique product ID (ISBN), the unique store ID associated with a particular associate, and an optional associate commission ID from the URL data string. For example, if the URL string is http://www.amazon.com/exec/obidos/ISBN=0809232022/mystoreA/, the parsing software parses the string to extract the unique product ID (ISBN) of 0809232022, the unique store ID of "mystore," and the commission ID of "A." In one implementation, the software 144 uses the commission ID to calculate an appropriate commission (e.g. 10% of merchant's sales price) to apply to the associate's account. As described below, if the customer subsequently adds the selected product to the shopping cart, the extracted information is recorded within a shopping cart data structure that corresponds to the customer.

5. UNIFIED SHOPPING CART FUNCTION

As discussed above, the present invention provides a system for maintaining a unified shopping cart that stores product information associated with product referrals from multiple Web sites, and keeps track of the sources (associates) of such referrals. One benefit of this feature is that it enables the customer to perform a single "check out" to purchase products from multiple Web sites. Additionally, this feature allows the merchant Web site 106 to accurately track and credit each associate, on a per-product-sale basis, that has referred a customer. For example, if, upon "check-out" from the merchant Web site 106, the customer has three books listed in the shopping cart, each of which resulted from a referral from a different associate Web site, each associate will be credited for its respective referral. While the shopping cart feature is particularly useful in the context of the disclosed referral system, the feature can also be applied to other types of Internet shopping systems that support shopping from multiple Web sites, including systems that use remote "agents" to monitor Web sites based on pre-specified selections of the customer.

The data structures and processing steps that implement the shopping cart will now be described with further reference to FIG. 5. As indicated above, the shopping cart maintains a customer-specific record of the products that have been selected by the customer, including the identities of any associate Web sites that acted as referral sources with respect to such products. Preferably, the computer program 144 maintains this information in a data structure that is stored on the Web site 106 for an extended period of time (such as one week) since the last access to the shopping cart by the user. This allows the customer to discontinue and later resume a shopping session without loss of the shopping cart data.

Upon customer selection of a referral link, the computer program 144 utilizes the customer cookie information 140 passed through an HTTP call to determine whether the particular customer (or technically, the customer computer 108) already has an open shopping cart (event E2). As part of this process, the computer program 144 executes cookie processing software (FIG. 1), which assigns a unique customer ID to the customer based on the cookie information 140. If the customer's Web browser 112 does not support the use of cookies (or if the cookies feature is disabled) the program 144 uses URL information received from the Web browser to generate the customer ID.

The customer ID is in turn used by the software 144 to identify any shopping cart currently associated with the customer. If no shopping cart exists for the customer, a new shopping cart structure (which includes the customer ID) is generated within the shopping cart database 152. The customer ID is also stored in a customer database 148. The algorithm used by the program 144 to generate the customer IDs is such that a cookie retrieved from the same customer computer will consistently produce the same customer ID. Thus, assuming the customer always uses the same computer to access the merchant site 106, and that the browser 112 supports the use of cookies, the customer will be assigned the same customer ID, and will be associated with any existing shopping cart.

In one implementation, once the customer has been referred to the merchant site 106 and the customer ID has been determined, the merchant site dynamically includes this ID within hyperlinks of the detail page and other Web pages that are sent to the customer computer 108. When the customer subsequently selects such a link (such as to add a selected product to the shopping cart), the customer ID is automatically transmitted to the merchant site 106 as part of the HTTP message. This allows the merchant site 106 to identify the customer (and shopping cart) without the need to re-request the cookie from the customer computer.

During the process of displaying detail pages and allowing the customer to add products to the shopping cart, neither the merchant site 106 nor the associate sites have access to the customer's personal information (name, address, credit card number, etc.). Thus, the system advantageously allows the customer to shop anonymously. Only when an order is actually submitted does the merchant site 106 obtain access to the customer's information, and at no time is the information provided to the associate sites.

With further reference to FIG. 5, the shopping cart is stored as a table or data structure within the shopping cart database 152, along with individual product selections made by customers. If the customer has an existing shopping cart, the computer program 144 will create another product selection entry within the shopping cart database 152, as indicated generally by event E3. If the customer does not have an existing shopping cart, then the computer program will create a new shopping cart data structure within the shopping cart database 152. The product selection entry within the shopping cart database 152 includes the store ID and product ID. If a product is selected directly from the merchant Web site 106, the corresponding store ID field may be blank or encoded with merchant-specific information. Other information may be stored in the shopping cart to implement the specific business procedures of the particular merchant.

When the customer subsequently purchases a product or products contained in the shopping cart, the associate's unique store ID maintained in the associate data structure 160 is used to appropriately credit the associate's account. During this process (or at the time of the referral) the computer program 144 determines whether the store ID represents a valid (enrolled) associate in the associates database 160. The processing at the merchant Web site 106 maintaining the associate's store ID in the shopping cart allows the system to obtain pricing information for a product and associate. In this way, the computer program 144 can be configured to generate special discounts or pricing incentives to the customer or associate depending on a particular business relationship.

The shopping cart stored in the shopping cart database 152 is maintained by the computer program 144 running at the merchant Web site 106 that monitors the open entries (non-closed shopping carts) in the shopping cart database 152. The shopping cart database 152 includes the customer ID, the date the shopping cart was opened (open date), and the date last accessed (touch date). The shopping cart database is monitored by the computer program 144 to purge all shopping carts that have been inactive (untouched) for a pre-defined period of time, such as one week.

Figure 8:
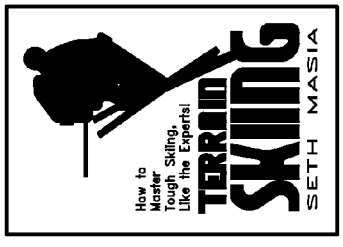
FIG. 8 is a screen display illustrating an HTML catalog document detail page of the merchant Web site.

FIG. 8 illustrates an example of an HTML catalog document (Web page) 136 corresponding to the product detail page. After processing a referral URL, the merchant Web server 132 sends the detail page 136 to the customer's Web browser 112 to provide the customer with additional information about the selected product. The product detail page includes the merchant's information (price, standard description, etc.) about the selected product. The product detail page 136 is shown with the URL passed to the customer Web browser 112 from the merchant Web server.

The URL (shown at the top of FIG. 8) comprises the unique customer ID 800 (obtained from the customer's cookie or URL information), the product ID 802 (shown as the ISBN of the Terrain Skiing book), the store ID 804 (shown as the "skinet" Web site), and the associate commission ID 806 (the letter "A"). Once the customer has reviewed the product detail page 136, the customer can select the "Add it to your Shopping Cart" hyperlink 808.

When the customer clicks on this hyperlink 808, the merchant Web server 132 returns a dynamically-generated HTML document that displays the contents of the shopping cart.

Figure 9:
FIG. 9 is a screen display illustrating a preferred shopping cart processing method in accordance with the present invention.

FIG. 9 illustrates an example HTML document 136 (Web page) corresponding to the customer shopping cart. The customer shopping cart document 136 displays information about the products currently selected by the customer for prospective purchase. In this example, the selection item 902 is displayed to the customer as the "Terrain Skiing" book previously selected. From this page 136, the customer may leave the shopping cart page, without proceeding to checkout, by either selecting the "continue shopping" link 904 or by using a Web browser navigational control to proceed to a different Web page.

Figure 10C:

FIG. 10a represents another associate's Web site where the customer can view products featured with editorial comments. For purposes of this example, it may be assumed that the customer proceeded directly to this site (e.g., by selecting a "favorite places" URL) from the shopping cart page of FIG. 9. If the customer selects the hyperlink 1000, the merchant Web server returns the product detail page for the "Cooking with Daniel Boulud" book, as illustrated in FIG. 10b. The customer may then add this book to the shopping cart by selecting the "Add it to your Shopping Cart" hyperlink 1002, and the customer will then be brought to the shopping cart Web page illustrated in FIG. 10c. The shopping cart now has product selection items corresponding to the two books selected by the customer during the shopping session, and each of these product selection items is stored in the shopping cart database to uniquely identify the respective associate that made the referral. When the customer selects the "Proceed to Checkout" hyperlink 1004 on the shopping cart Web page, the merchant Web site returns a form document (not shown) that allows the customer to specify payment information, shipping information, and other information needed to process the order.

As illustrated by the above example, one customer shopping cart can have line items (corresponding to book selections) from many different associate Web sites. In addition, the shopping cart can include line items of books that have been selected directly from the merchant As described above, because the shopping cart keeps track of each referral, the referring associates can efficiently be credited for their respective referrals upon order submission, without the need for the customer to perform multiple "check-outs."

The merchant Web site includes credit generation software for calculating associate referral credit. Referral credit may be calculated in any of a number of ways depending on the associate and merchant business relationship, and may be provided to the associate on a periodic basis, such as at the end of each calendar quarter. For example, the associate may be paid a fixed percentage of the list selling price. As indicated above, commission payments may be made automatically using an appropriate electronic payment method.

As will be appreciated from the foregoing, the shopping cart feature of the system enables the customer to view the entire shopping experience as a seamless, automated shopping session. The seamless nature of the session allows the customer to shop for products based on the marketing expertise of the associates, while conveniently utilizing the merchant's order fulfillment resources.

6. REPORT GENERATION FUNCTION

The merchant Web site also preferably includes report generation software (FIG. 1) that automatically generates and transmits associate feedback reports to respective associates, based on information stored by the merchant Web site. The software can be configured to generate the reports on a daily, weekly, monthly and/or annual basis. The information contained within these reports enables the associates to evaluate the effectiveness of their Web sites on a per-product basis.

One report produced by the AMAZON.COM site is the "Weekly Activity Report." An example of such a report is included as Appendix B. This report provides information about the number of books ordered through the associate's referral links, the number of selections (hits) of each referral link, and the amount of referral credit earned on orders in the time period.

Various other types of information can be provided within the feedback reports to assist the associates in conducting business. For example, the reports can provide anonymous demographic data about the customers that made purchases from the associate site, including the geographic regions (as determined from shipping addresses) of such customers. Additionally, the reports can provide special notices, including notices about books that pay lower referral credit to associates, and any problems occurring with an associate's referral links. The report generation feature also may provide associates with the ability to access an on-line menu to generate custom feedback reports (such as a report of the number of referrals during a specific period of time), or to set up a report profile that specifies the content, format and frequency of the automated reports.

7. CONCLUSION

While the invention has been described herein with reference to certain preferred embodiments, these embodiments have been presented by way of example only, and not to limit the scope of the invention. Accordingly, the scope of the invention should be defined only in accordance with the claims that follow.

In the following claims, reference characters used to designate claim steps are provided for convenience of description only, and are not intended to imply any particular order for performing the steps.

APPENDIX A

Date: Tue, 24 Jun. 1997 02:11:28-0700 (PDT)
To: mystore@aol.com
Subject: Amazon.com Books: Thank you for your application
Cc: associates@amazon.com
Thanks for submitting your application to participate in the Amazon.com Associates Program. Your application has been temporarily approved. We'll contact you by e-mail once we have reviewed and approved your application.
*Important*: Be sure to save this email message—you will need some of the information here to properly set up your links to Amazon.com.
You can set up your Web site now. You have been assigned a unique Associates ID. You'll use this ID when linking your sponsoring Web site into our catalog; detailed instructions are included at the end of this message.

Your unique Associates ID is: mystore.
Using the Amazon.com Brand Name
As you may already know, Amazon.com has received a great deal of very positive press coverage since we opened. From The Wall Street Journal, Newsweek and the Associated Press to PC Magazine and WebWeek, mainstream and industry press alike have helped to make the Amazon.com brand name one of the more well-known among Internet sites.
Our extensive advertising campaign reaches users of many major Web services and search tools, and our printed ads are found in places like the New York Times Review of Books. You should consider using not only our name but one of the logos or banners found on our site at:
   http://www.amazon.com/exec/obidos/subst/assoc-art.html
so that your visitors have the chance to recognize our name as a familiar and trustworthy Internet retailer working in association with you.
Suggestions for Successful Presentation:
We've put a page on our Web site filled with suggestions for building a great online bookstore. These tips are taken from our most successful Associates, and we highly recommend reading them. Follow the link on our home page to "Build Your Own Bookstore", and from there link to "Build a Great Bookstore". You can also connect directly at this URL:
   http://www.amazon.com/exec/obidos/subst/assoc-success-tips.html
How to Link into Our Catalog:
You can use any sort of book descriptions, review material and graphics that you like when describing books on your Web site. All we need is a separate link into our catalog for each book you wish to recommend. You may add or remove these links at any time without our prior approval; as long as they follow the prescribed format we'll detect them automatically when they are used.
Each link to our catalog will be the same except for the ISBN of the book. You'll see the "isbn=" part of the link at the end of each example below. To find the ISBN of the book you wish to list, use our Web site and search for that book with any of our search tools. The ISBN for each edition (hardcover, paperback, book on tape) is displayed on the detail page for that book.
Remember—you may change which books you list whenever you like. You won't need our permission and it's not even necessary to advise us of the changes—they'll be automatically detected and commissioned properly.

Example

For each book you recommend, link it to us like this:
http://www.amazon.com/exec/obidos/ISBN=1234567890/mystoreA/
Note: You *must* use a capital A at the end of this link, not a lower-case a.
Of course, the ISBN will change for each book. Do not include any spaces or dashes in the ISBN when making these links. Also, make sure to check our catalog first—we can only sell what's listed there.
VERY IMPORTANT: If you copy the URL of a book page from our Web site and modify it to fit the format above, be sure to remove the 19-character shopping cart ID that appears at the end of the bookmarked or copied URL. Your store code should immediately follow the ISBN as in the example above. If you leave this in your modified links, they will not work properly.
The information we have about your Web site is as follows:
Contact e-mail Address:
   mystore@aol.com
Contact address:
   John Doe
   1234 East Road
   Anytown
   WA
   12345
Payee e-mail address:
   mystore@aol.com
Payee address:
   Doe Enterprises, Inc.
   1234 East Road
   Anytown
   WA
   12345
Description of books you intend to list:
Business Books—How to Business Books
Sponsoring Web site name:
Sponsoring Web site URL:
Your Web site name, in the format we may use on our website:
   Mystore—Anytown, Wash. in association with Amazon.com Books
If you have any questions, you can e-mail us at associates@amazon.com and we'll be happy to help.
Once again, thanks for your application.
Sincerely,
Associates staff
Amazon.com Books
http://www.amazon.com/
2.5 million titles, consistently low prices

APPENDIX B

Amazon.com Associates Program
Weekly Activity Reports
Every week, we e-mail our Associates a detailed activity report so that they can track the effectiveness of their efforts. A sample of the report shows what you can expect to receive weekly:
Sample Weekly Activity Report
Last Week's Sales Results
Note: This report includes a column labeled "ORDERED," which is the weekly number of copies for which orders have been placed through your special links. Only after these orders are paid for and shipped will they actually count toward your referral fee. Some of these orders may later be canceled, customers' credit cards may be declined, and occasional returns should be expected; in any of these cases, the referral fee will not be earned.
The column labeled "HITS" represents the number of times one of your visitors clicked on a book (this column can help you gauge your visitors' interest in the books you are selling). The column labeled "REFERRAL FEE" represents the referral fees your site has earned on orders. Please remember that we pay you based on orders *shipped*, so your actual Referral Fee may be somewhat lower than the fee stated here.
Look for special notices in the titles listed below. They can help you track books that may not pay referral fees and identify certain problems with the link format you may be using
1 indicates that this item is currently being featured at a discount of more than 30%.
2 indicates that this item is "special order" or carries no discount
Other notes may indicate problems with a link format or items no longer carried in our catalog.
Quarter-to-Date Books Ordered: 105
Quarter-to-Date Qualified Book Revenue: 4266.46
Quarter-to-Date Referral Fees: 519.04
Click-throughs and sales by individual book for the week of 12 Jan. 97 through 18 Jan. 97 Store ID mystore

| ISBN | HITS | ORDERED | YOUR FEE | TITLE |
|---|---|---|---|---|
| 0534517072 | 4 | 2 | 1.70 | 2 Earth Online: An Internet Guide 2 sold at 0% off list price of 16.95 |
| 0672309599 | 3 | 0 | 0.00 | Microsoft SQL Server 6.5 Dba Survival G |
| 0764530038 | 2 | 0 | 0.00 | Danny Goodman's JavaScript Handbook |
| 0789704927 | 355 | 11 | 65.99 | Building Delphi 2 Database Applications 11 sold at 20% off list price of 49.99 |
| 0789704943 | 2 | 0 | 0.00 | Using VRML |
| 0789707500 | 1 | 0 | 0.00 | Delphi 2 Tutor: The Interactive Seminar |
| 1568302894 | 110 | 6 | 8.10 | 1 Creating Killer Web Sites: The A sold at 40% off the list price of 45.00 |
| Totals: | 477 | 19 | 75.79 | |

| | |
|---|---|
| Number of Visitors on Jan. 19, 1997 | 68 |
| Number of Visitors on Jan. 20, 1997 | 65 |
| Number of Visitors on Jan. 21, 1997 | 54 |
| Number of Visitors on Jan. 22, 1997 | 59 |
| Number of Visitors on Jan. 23, 1997 | 50 |
| Number of Visitors on Jan. 24, 1997 | 47 |
| Number of Visitors on Jan. 25, 1997 | 32 |
| Total Visitors this week | 375 |

Number of Visitors on 19 Jan. 97 68
Number of Visitors on 20 Jan. 97 65
Number of Visitors on 21 Jan. 97 54
Number of Visitors on 22 Jan. 97 59
Number of Visitors on 23 Jan. 97 50
Number of Visitors on 24 Jan. 97 47
Number of Visitors on 25 Jan. 97 32
Total Visitors this week 375
NOTE: A "Visitor" is a person who clicks on book links from your site, and is counted as 1 visitor (above) regardless of the number of different titles they click on. We keep track of this by watching their shopping cart ID, which remains the same for every book they click on.
A "Hit" is any person clicking on a book link, and each click is counted as 1 hit. If the same visitor clicks on 5 different titles, we record 1 visitor and 5 hits. Therefore, you should expect the number of visitors to be lower than the total number of hits.

What is claimed is:

1. A system that provides services for implementing a referral program in which participant sites refer users to a computer-implemented retail site, the system comprising:
    a referral tracking system configured to track referrals of users from the participant sites to the retail site using information encoded in referral links provided on the participant sites, said referral tracking system operative to maintain data that associates particular item purchases made from the retail site with particular participant sites to which such purchases are attributable; and
    a report generation system that uses the data maintained by the tracking system to generate activity reports for particular participant sites, said activity reports revealing, for a particular participant site and time period, a total number of user referrals that occurred, and how many of said user referrals resulted in purchases, said report generation system configured to transmit the activity reports to corresponding referral program participants to enable the participants to evaluate the effectiveness of their participant sites, wherein the report generation system is configured to provide, within an activity report for a participant site, information regarding a problem occurring with a referral link on the participant site;
    said referral tracking system and report generation system comprising computer hardware that executes program code.

2. The system of claim 1, wherein the report generation system is operable to include, within an activity report for a participant site, demographic data of users referred by the participant site to the retail site.

3. The system of claim 2, wherein the demographic data is based on shipping addresses of the referred users.

4. The system of claim 1, wherein the report generation system is capable of providing, within an activity report for a participant site, separate performance data for each of a plurality of item-specific referral links of the participant site.

5. The system of claim 1, wherein the referral tracking system is configured to use catalog-item identifiers encoded in the referral links to maintain data that associates particular user referral events with particular catalog items available on the retail site.

6. The system of claim 1, further comprising an enrollment system that automates an enrollment process for enrolling entities to participate in the referral program.

7. The system of claim 6, wherein the enrollment system is configured to provide, to a program participant, linking instructions for creating referral links that are encoded with information for enabling the referral tracking system to track user referrals.

8. The system of claim 6, wherein the enrollment system is configured to use information supplied by a referral program applicant regarding a candidate site to automatically assess whether the candidate site is qualified to participate in the referral program.

9. The system of claim 1, wherein the referral tracking system is configured to use referral information maintained in electronic shopping carts of users of the retail site to associate particular purchases with particular participant sites.

10. The system of claim 1, further comprising a merchant site in communication with the referral tracking system and the report generation system.

11. A computer-implemented process implemented in connection with a referral program in which participant sites refer users to a computer-implemented retail site, the process comprising:

tracking referrals of users from the participant sites to the retail site using information encoded in referral links provided on the participant sites, said tracking of referrals comprising storing referral event data regarding particular referral events;

tracking, in association with the referrals, purchases made on the retail site by users referred by the participant sites;

generating, for a participant site, based on the tracked referrals and purchases that are associated with the participant site, an activity report that reveals, for a particular time period, a total number of user referrals attributed to the participant site, and how many of said attributed user referrals resulted in purchases, wherein generating the activity report comprises providing, in the activity report information regarding a problem occurring with a referral link on the participant site; and transmitting the activity report to a referral program participant associated with the participant site;

said process implemented by a system that comprises computer hardware.

12. The process of claim 11, wherein generating the activity report comprises providing, in the activity report, demographic data of users referred by the participant site to the retail site.

13. The process of claim 12, wherein the demographic data is based on shipping addresses of the referred users.

14. The process of claim 11, wherein generating the activity report comprises providing, in the activity report, separate performance data for each of a plurality of item-specific referral links of the participant site.

15. The process of claim 11, wherein tracking the referrals comprises using catalog-item identifiers encoded in the referral links to maintain data that associates particular user referral events with particular catalog items available on the retail site.

16. The process of claim 11, further comprising providing an enrollment system that automates an enrollment process for enrolling entities to participate in the referral program.

17. The process of claim 16, further comprising automatically transmitting, to a program participant in response to enrollment, linking instructions for creating referral links that are encoded with information for tracking user referral events.

18. The process of claim 16, further comprising, by said enrollment system, using information supplied by a referral program applicant regarding a candidate site to automatically assess whether the candidate site is qualified to participate in the referral program.

19. The process of claim 11, wherein tracking the referrals comprises using referral information maintained in electronic shopping carts of users of the retail site to associate particular purchases with particular participant sites.

20. The process of claim 11, wherein generating the activity report comprises incorporating into the activity report, for each of a plurality of product-specific referral links of the participant site, an indication of (1) a number of referrals attributable to the respective link, and (2) a number of orders placed for a product corresponding to the respective link.

21. The process of claim 20, wherein generating the activity report further comprises incorporating into the report, for each of the plurality of product-specific referral links, an indication of a respective monetary amount earned by the referral program participant.

22. The system of claim 1, wherein the report generation system is configured to generate, for a participant site that includes a plurality of product-specific referral links, an activity report the specifies, for each of the plurality of product-specific referral links, (1) a number of referrals attributed to the respective link, and (2) a number of product orders corresponding to the respective link.

23. The system of claim 1, wherein the report generation system is configured to generate, for a participant site that includes a plurality of product-specific referral links, an activity report the specifies, for each of the plurality of product-specific referral links, a respective monetary amount earned.

24. The system of claim 1, wherein the report generation system includes report customization functionality that enables program participants to specify the content and format of their activity reports.

* * * * *

UNITED STATES PATENT AND TRADEMARK OFFICE
CERTIFICATE OF CORRECTION

PATENT NO.         : 8,732,011 B2                                      Page 1 of 1
APPLICATION NO.    : 13/154270
DATED              : May 20, 2014
INVENTOR(S)        : Bezos et al.

It is certified that error appears in the above-identified patent and that said Letters Patent is hereby corrected as shown below:

In the Specification

In column 1 at line 25, change "of" to --embodiment of--.

In column 2 at line 40, change "merchant" to --merchant.--.

In column 2 at line 59, change "preferred," to --preferred embodiment,--.

In column 4 at line 24, change "is" to --embodiment is--.

In column 6 at line 47, change "merchant" to --merchant.--.

In column 8 at line 38, change "the" to --the embodiment--.

In column 10 at line 14, change "of" to --embodiment of--.

In column 11 at line 65, change "merchant" to --merchant.--.

In column 15 at line 53, change "merchant" to --merchant.--.

Signed and Sealed this
Eleventh Day of November, 2014

Michelle K. Lee
*Deputy Director of the United States Patent and Trademark Office*